(12) United States Patent
Beunet et al.

(10) Patent No.: US 10,822,267 B2
(45) Date of Patent: Nov. 3, 2020

(54) CRACK-RESISTANT GLASS-CERAMIC ARTICLES AND METHODS FOR MAKING THE SAME

(71) Applicant: CORNING INCORPORATED, Corning, NY (US)

(72) Inventors: Lionel Joel Mary Beunet, Montigny Loing (FR); Marie Jacqueline Monique Comte, Fontenay aux Roses (FR); Allan Mark Fredholm, Vulaines sur Seine (FR); Qiang Fu, Painted Post, NY (US); Anne Paris, Thomery (FR); Sophie Peschiera, Veneux les Sablons (FR); Charlene Marie Smith, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 443 days.

(21) Appl. No.: 15/641,875

(22) Filed: Jul. 5, 2017

(65) Prior Publication Data
US 2017/0341974 A1    Nov. 30, 2017

Related U.S. Application Data

(62) Division of application No. 14/505,763, filed on Oct. 3, 2014, now Pat. No. 9,701,574.

(Continued)

(51) Int. Cl.
*C03C 10/00* (2006.01)
*C03B 32/02* (2006.01)
(Continued)

(52) U.S. Cl.
CPC .......... *C03C 10/0027* (2013.01); *C03B 32/02* (2013.01); *C03C 3/093* (2013.01);
(Continued)

(58) Field of Classification Search
CPC ...................................................... C03B 32/02
See application file for complete search history.

(56) References Cited

U.S. PATENT DOCUMENTS

| 2,920,971 A | 1/1960 | Stookey |
| 3,157,522 A | 11/1964 | Stookey |

(Continued)

FOREIGN PATENT DOCUMENTS

| CN | 103025674 B | 9/2015 |
| EP | 0076692 A1 | 4/1983 |

(Continued)

OTHER PUBLICATIONS

Author Unknown; "Agilent Basics of Measuring the Dielectric Properties of Materials"; Application Note; Agilent Technologies; www.agilent.com 34 Pages.

(Continued)

*Primary Examiner* — Erin Snelting
(74) *Attorney, Agent, or Firm* — Kevin M. Johnson

(57) ABSTRACT

Glass-ceramics exhibiting a Vickers indentation crack initiation threshold of at least 15 kgf are disclosed. These glass-ceramics may be ion exchangeable or ion exchanged. The glass-ceramics include a crystalline and amorphous phases generated by subjecting a thin precursor glass article to ceramming cycle having an average cooling rate in the range from about 10° C./minute to about 25° C./minute. In one or more embodiments, the crystalline phase may comprise at least 20 wt % of the glass-ceramics. The glass-ceramics may include β-spodumene ss as the predominant crystalline phase and may exhibit an opacity ≥about 85% over the wavelength range of 400-700 nm for an about 0.8 mm thickness and colors an observer angle of 10° and a CIE (Continued)

illuminant F02 determined with specular reflectance included of a* between −3 and +3, b* between −6 and +6, and L* between 88 and 97.

21 Claims, 7 Drawing Sheets

Related U.S. Application Data

(60) Provisional application No. 61/888,617, filed on Oct. 9, 2013.

(51) Int. Cl.
*C03C 3/093* (2006.01)
*C03C 21/00* (2006.01)

(52) U.S. Cl.
CPC ...... *C03C 10/0018* (2013.01); *C03C 10/0045* (2013.01); *C03C 10/0054* (2013.01); *C03C 21/002* (2013.01); *Y10T 428/315* (2015.01)

(56) References Cited

U.S. PATENT DOCUMENTS

| | | | |
|---|---|---|---|
| 3,282,770 A | 11/1966 | Stookey et al. | |
| 3,537,868 A | 11/1970 | Kosaka | |
| 3,715,220 A | 2/1973 | Confer et al. | |
| 3,839,056 A | 10/1974 | Grossman | |
| 3,931,438 A | 1/1976 | Beall et al. | |
| 3,985,533 A | 10/1976 | Grossman | |
| 4,126,477 A | 11/1978 | Reade | |
| 4,467,039 A | 8/1984 | Beall et al. | |
| 4,977,110 A | 12/1990 | Amundson, Jr. et al. | |
| 5,070,045 A | 12/1991 | Comte et al. | |
| 5,173,453 A | 12/1992 | Beall et al. | |
| 5,788,731 A * | 8/1998 | Suzuki .................. | C03B 32/02 65/102 |
| 5,972,816 A | 10/1999 | Goto | |
| 6,060,412 A | 5/2000 | Ishida | |
| 6,387,509 B1 | 5/2002 | Goto et al. | |
| 6,420,287 B1 | 7/2002 | Sakamoto et al. | |
| 6,846,760 B2 | 1/2005 | Siebers et al. | |
| 7,205,252 B2 | 4/2007 | Becker et al. | |
| 7,465,121 B1 | 12/2008 | Hendricks et al. | |
| 7,465,686 B2 | 12/2008 | Comte | |
| 7,476,633 B2 | 1/2009 | Comte et al. | |
| 7,507,681 B2 | 3/2009 | Aitken et al. | |
| 8,021,999 B2 | 9/2011 | Beall | |
| 8,048,816 B2 | 11/2011 | Beall et al. | |
| 8,664,130 B2 | 3/2014 | Beall et al. | |
| 8,664,131 B2 | 3/2014 | Beall et al. | |
| 2005/0153142 A1 | 7/2005 | Belykh et al. | |
| 2007/0105700 A1 | 5/2007 | Horsfall et al. | |
| 2007/0213192 A1 | 9/2007 | Monique Comte et al. | |
| 2009/0142568 A1 | 6/2009 | Dejneka et al. | |
| 2010/0047521 A1 | 2/2010 | Amin et al. | |
| 2010/0069218 A1 | 3/2010 | Baldi et al. | |
| 2010/0224619 A1 | 9/2010 | Schoenberger et al. | |
| 2011/0092353 A1 | 4/2011 | Amin et al. | |
| 2011/0201490 A1 | 8/2011 | Barefoot et al. | |
| 2011/0226231 A1 | 9/2011 | Siebers et al. | |
| 2011/0293942 A1 | 12/2011 | Cornejo et al. | |
| 2012/0035041 A1 | 2/2012 | Comte | |
| 2012/0135226 A1 | 5/2012 | Bookbinder et al. | |
| 2012/0157290 A1 | 6/2012 | Gabel et al. | |
| 2013/0045375 A1 | 2/2013 | Gross | |
| 2013/0224493 A1 * | 8/2013 | Gabel .................. | C03B 32/02 428/410 |
| 2013/0274085 A1 | 10/2013 | Beall et al. | |
| 2014/0066285 A1 | 3/2014 | Beall et al. | |
| 2014/0144181 A1 | 5/2014 | Poissy | |
| 2014/0318184 A1 | 10/2014 | Likitvanichkul et al. | |
| 2015/0027169 A1 | 1/2015 | Fredholm | |
| 2015/0368147 A1 | 12/2015 | Dejneka et al. | |

FOREIGN PATENT DOCUMENTS

| | | |
|---|---|---|
| EP | 0326735 A1 | 8/1989 |
| EP | 0634374 A1 | 1/1995 |
| EP | 1901999 31 | 11/2009 |
| WO | 2007003567 A1 | 1/2007 |
| WO | 2009070236 A1 | 6/2009 |
| WO | 2010002477 A1 | 1/2010 |
| WO | 2010096630 A1 | 8/2010 |
| WO | 2011022661 A2 | 1/2011 |
| WO | 2012166761 A1 | 12/2012 |
| WO | 2013012513 A1 | 1/2013 |
| WO | 2013136013 A2 | 9/2013 |
| WO | 2013155281 A1 | 10/2013 |
| WO | 2014120628 A2 | 8/2014 |

OTHER PUBLICATIONS

Baker-Jarvis et al; "Analysis of an Open-Ended Coaxial Probe With Lift-Off for Nondestructive Testing"; IEEE Transactions on Instrumentation and Measurement, vol. 43, No. 5 Oct. 1994 pp. 711-718.

Baker-Jarvis et al; "Dielectric and Conductor-Loss Characterization and Measurements on Electronic Packaging Materials"; NIST Technical Note 1520; Jul. 2001; 158 Pages.

Baker-Jarvis et al; "High-Frequency Dielectric Measurements"; IEEE Instrumentation & Measurement Magazine, Apr. 2010 pp. 24-31.

Baker-Jarvis et al; "Measuring the Permittivity and Permeability of Lossy Materials: Solids, Liquids, Metals, Building Materials, and Negative-Index Materials"; NIST Technical Note 1536; 160 Pages.

Baker-Jarvis et al; "Transmission/Reflection and Short-Circuit Line Methods for Measuring Permittivity and Permeability"; NIST Technical Note; 151 Pages; Issued Jul. 1990.

Cavalcante et al; "Ceramic Application of Mica Titania Pearlescent Pigments"; Science Direct, Dyes and Pigments 74 (2007) 1-8.

H.E. Bussey; "Measurement of RF Properties of Materials a Survey"; Proceedings of the IEEE, vol. 55, No. 6; Jun. 1967; pp. 1046-1053.

International Search Report and Written Opinion of the International Searching Authority; PCT/US2014/059833; dated Apr. 7, 2015, 13 Pages.

J. Crank; "The Mathematics of Diffusion" Second Edition; Oxford University Press, 1975; 2 Pages.

J.C. Taylor; "Rietveld Made Easy a Practical Guide to the Understanding of the Method and Successful Phase Quantifications"; 3 Pages; Sep. 2004.

Kobayashi et al; "Chemical Strengthening of Glass and Industrial Application"; Toshiba Research and Development Center; Glass Engineering Dept.; pp. 109-112; 1977.

Author Unknown; Orihara FSM 6000LE Surface Stress Meter Brochure; Date Unknown.

Author Unknown; Orihara FSM 7000H Surface Stress Meter Brochure; Date Unknown.

Author Unknown; Orihara Surface Stress Meter Brochure; Cat No. FS-0013E; Date Unknown.

International Search Report and Written Opinion of the Internaitonal Searching Authority; PCT/US2013/036142; dated Aug. 2, 2013; 21 Pages; US Commissioner for Patents.

Sglavo et al; "Procedure for Residual Stress Profile Determination by Curvature Measurements"; Mechanics of Materials, 37, (2005) 887-898.

Standard Test Method for Annealing Point and Strain Point of Glass by Beam Bending; Designation: C598-93 ASTM; Reapproved 2008; 5 Pages.

Standard Test Method for Determination of Fracture Toughness of Advanced Ceramics at Ambient Temperature Designation: C1421-10 ASTM; Downloaded 2013; 32 Pages.

Standard Test Method for Dynamic Young's Modulus, Shear Modulus, and Poisson's Ratio for Advanced Ceramics by Impulse Excitation of Vibration, Designation: C1259-08 ASTM; Downloaded 2013; 17 Pages.

(56) References Cited

OTHER PUBLICATIONS

Standard Test Method for Linear Thermal Expansion of Solid Materials With a Push-Rod Dilatometer, Designation: E228-11, ASTM; Downloaded 2013; 10 Pages.
Standard Test Method for Monotonic Equibiaxial Flexural Strength of Advanced Ceramics at Ambient Temperature Designation: C1499-09, ASTM; Downloaded 2013; 14 Pages.
Standard Test Method for Plane-Strain Fracture Toughness of Metalic Materials Designation: E399-90 ASTM; Reapproved 1997; 31 Pages.
Standard Test Method for Vickers Indentation Hardness of Advanced Ceramics Designation: C1327-08 ASTM; Downloaded 2013; 9 Pages.
Toru Kishii "Surface Stress Meters Utilising the Optical Waveguide Effect of Chemically Tempered Glasses"; Optics and Lasers in Engineering, 4 (1983) 25-38.
Taiwan Patent Application No. 103135215 Search Report dated Apr. 25 2018; 1 Page; Taiwan Patent Office.
European Patent Application No. 14786770.9 Office Action dated July 28, 2020; 4 Pages; European Patent Office.
Gutzow et al; "Basic Properties and the Nature of Glasses: An Overview" ; Basic Properties and the Nature of Glasses: An Overview; (2011); pp. 9-89.

\* cited by examiner

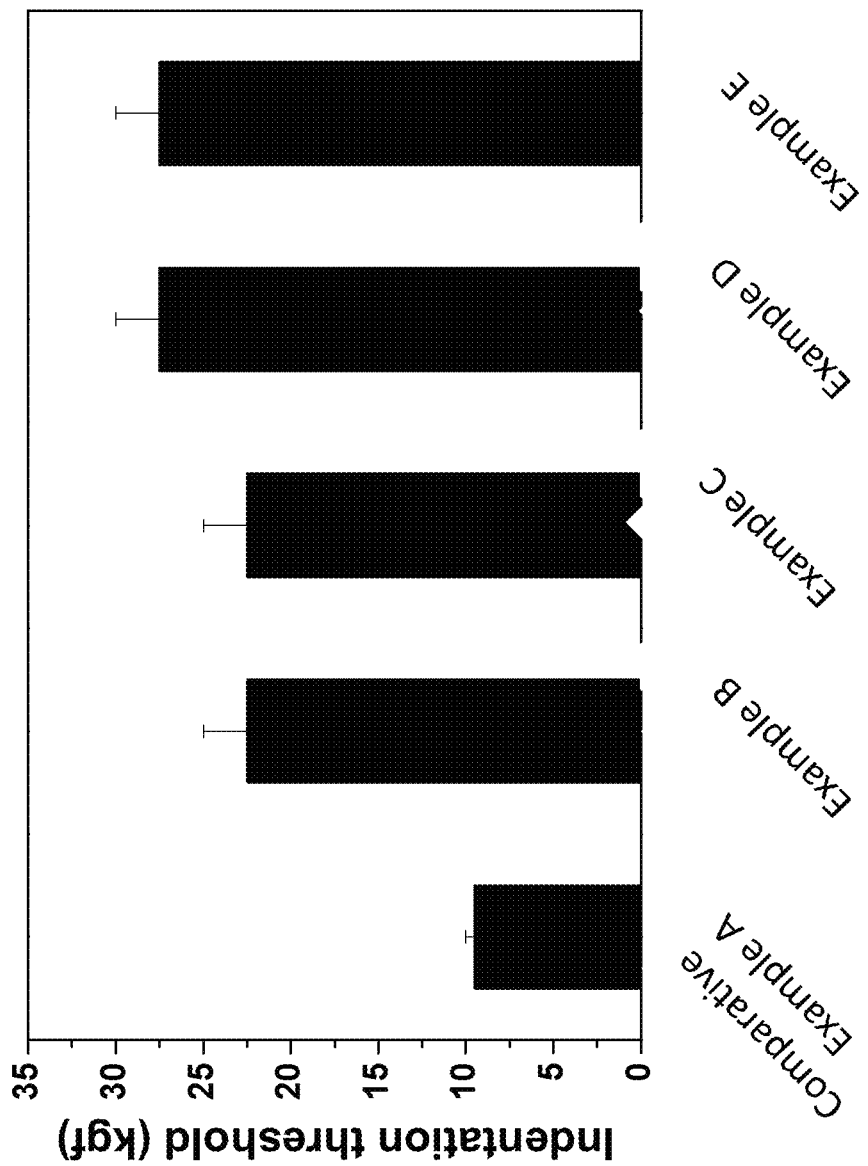

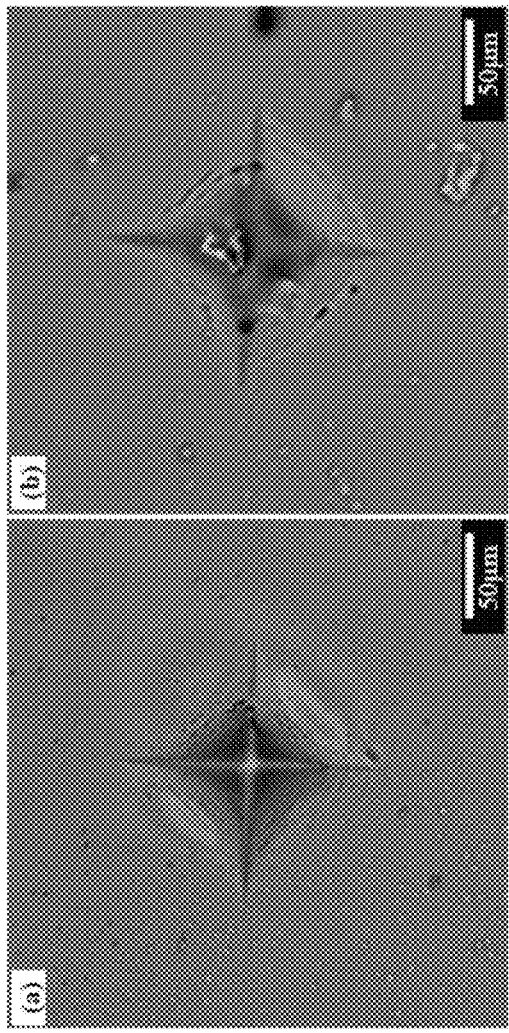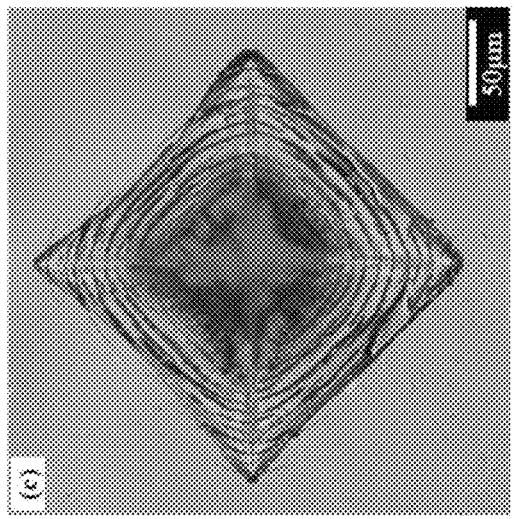

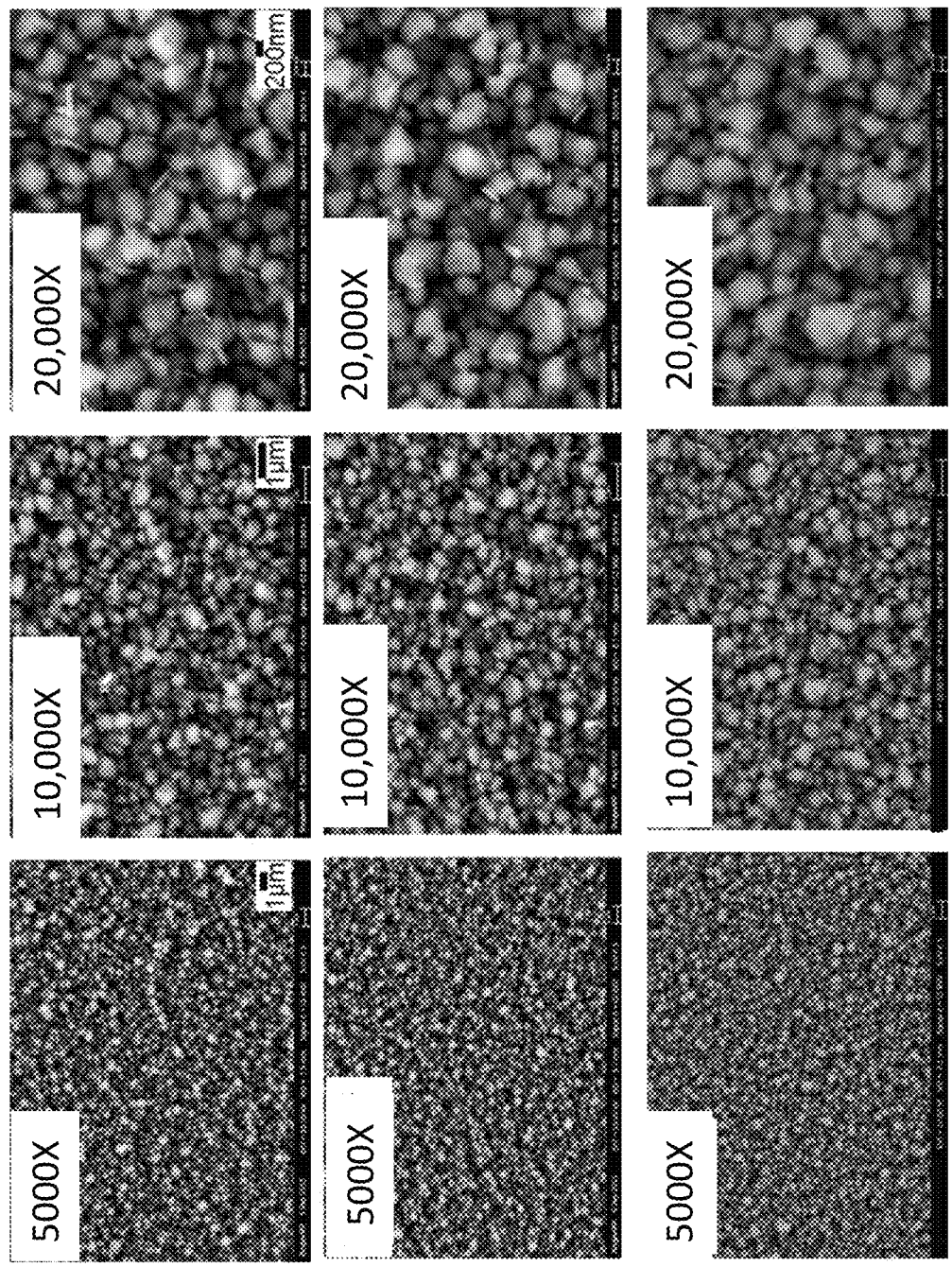

CRACK-RESISTANT GLASS-CERAMIC ARTICLES AND METHODS FOR MAKING THE SAME

CROSS-REFERENCE TO RELATED APPLICATIONS

This application claims the benefit of priority under 35 U.S.C. §119 of U.S. Provisional Application Ser. No. 61/888,617 filed on Oct. 9, 2013, the content of which is relied upon and incorporated herein by reference in its entirety.

BACKGROUND

The present disclosure relates to glass-ceramics and precursor glass articles which may be ion exchangeable and/or ion exchanged glass-ceramics, methods for making the same and articles comprising the same. In particular, the present disclosure relates to white, opaque, glass-ceramics and precursor glasses, which may be ion exchangeable and/or ion exchanged, methods for making the same, and articles comprising the same.

In the past decade, as electronic devices such as notebook computers, personal digital assistants, portable navigation device, media players, mobile phones, and portable inventory devices have converged while at the same time becoming small, light, and functionally more powerful. One factor contributing to the development and availability of such smaller devices is an ability to increase computational density and operating speed by ever decreasing electronic component sizes. However, the trend to smaller, lighter, and functionally more powerful electronic devices presents a continuing challenge regarding design of some components of the portable computing devices.

Components associated with portable computing devices encountering particular design challenges include the enclosure or housing used to house the various internal/electronic components. This design challenge generally arises from two conflicting design goals—the desirability of making the enclosure or housing lighter and thinner, and the desirability of making the enclosure or housing stronger and more rigid. Lighter enclosures or housings, typically thin plastic structures with few fasteners, tend to be more flexible while having a tendency to buckle and bow as opposed to stronger and more rigid enclosure or housings, typically thicker plastic structures with more fasteners having more weight. Unfortunately, the increased weight of the stronger, more rigid plastic structures might lead to user dissatisfaction, while the bowing and buckling of the lighter structures might damage the internal/electronic components of the portable computing devices and almost certainly leading to user dissatisfaction.

Among known classes of materials are glass-ceramics that are used widely in various other applications (e.g., in kitchens as cooktops, cookware, and eating utensils, such as bowls, dinner plates, and the like). Transparent glass-ceramics are used in the production of oven and/or furnace windows, optical elements, mirror substrates, and the like. Glass-ceramics are typically made by crystallizing precursor glasses at specified temperatures for specified periods of time to nucleate and grow crystalline phase(s) in a glass matrix. Exemplary glass-ceramics include those based on the $SiO_2$—$Al_2O_3$—$Li_2O$ glass system having either β-quartz solid solution ("β-quartz ss" or "β-quartz") as the predominant crystalline phase or β-spodumene solid solution ("β-spodumene ss" or "β-spodumene") as the predominant crystalline phase.

Known glass-ceramics are formed using a conventional glass melting process that forms a thick sheet of glass (e.g., 15 mm) through a conventional rolling process. The thick sheet of glass is then crystallized through a long ceramming cycle (e.g., 7 to 10 hours) at a specified temperature in a continuous rolling hearth, to generate a glass-ceramic with appropriate predominant crystalline phase and crystalline phase ratio. After processing to the final component geometry, the glass-ceramic can be strengthened via an ion-exchange process to provide specified mechanical properties.

As stated, in view of the foregoing problems with existing enclosures or housings, there exists a need for materials such as glass-ceramics (which may be ion exchangeable or ion exchanged) that provide improved enclosures or housings for portable computing devices. Also, there exists a need for such materials that exhibit improved mechanical properties such as crack resistance, and exhibit improved whiteness levels and/or opaque colors while addressing, in an aesthetically pleasing manner, the design challenges of creating light, strong, and rigid enclosures or housings. Moreover, there is a need for processes for producing such materials in an efficient manner.

SUMMARY

A first aspect of the present disclosure pertains to a glass-ceramic article. In one or more embodiments, the glass-ceramic article exhibits a Vickers crack initiation threshold of at least about 15 kgf, at least about 20 kgf or at least about 25 kgf, and a crystalline phase and an amorphous phase generated by ceramming a precursor glass article having a thickness of less than about 5 mm or less. In one or more embodiments, the crystalline phase may include at least about 20 wt % or at least about 70 wt % of the glass-ceramic article. In one or more embodiments, the glass-ceramic is cooled at an average cooling rate in the range from about 10° C./minute to about 25° C./minute during ceramming.

In one or more embodiments, the precursor glass article may be cerammed by cooling the glass article after heat treatment at the average cooling rate, for a duration of less than 1.5 hours. In on variant, the precursor glass article may be cerammed by cooling the precursor glass article after heat treatment at a rate of 300° C./minute to 500° C./minute, for a duration of less than 2 minutes.

The glass-ceramic article of one or more embodiments has a crystalline phase including at least one of a β-spodumene solid solution, a Ti-containing crystalline phase, a spinel structure and cordierite. Where the glass-ceramic article includes a Ti-containing crystalline phase, the Ti-containing crystalline phase may include at least one of rutile, anatase, magnesium titanate and aluminum titanate. In one or more embodiments, the crystalline phase includes β-spodumene, which may optionally be the predominant crystalline phase.

The glass-ceramic article may exhibit a color presented in CIELAB color space coordinates for an observer angle of 10° and a CIE illuminant F02 determined from reflectance spectra measurements using a spectrophotometer with specular reflectance included, of: CIE a* between −3 and +3, CIE b* between −6 and +6, and CIE L* between 88 and 97. In one variant, the glass-ceramic article may be opaque and/or exhibit an average opacity of at least 85% over a wavelength in the range from about 400 nm to about 700 nm for a thickness of about 0.8 mm.

The glass-ceramic article may further include a compressive stress layer extending from a surface of the glass-ceramic article into a depth within the glass-ceramic article. The compressive stress layer may have a compressive stress of about 300 MPa or greater, and the thickness or depth of the compressive stress layer may be about 1% of an overall thickness of the glass-ceramic article or greater.

In some embodiments, the precursor glass article may include a compressive stress layer extending from a surface of the precursor glass article into a depth within the glass article. The compressive stress layer may have a compressive stress of about 300 MPa or greater, and the thickness or depth of the compressive stress layer may be about 1% of an overall thickness of the precursor glass article or greater.

In one or more embodiments, the glass-ceramic article and/or precursor glass article may include a composition, in mole %, including:

$SiO_2$ in the range from about 62 to about 75;
$Al_2O_3$ in the range from about 10.5 to about 17;
$Li_2O$ in the range from about 5 to about 13;
ZnO in the range from about 0 to about 4;
MgO in the range from about 0 to about 8;
$TiO_2$ in the range from about 2 to about 5;
$B_2O_3$ in the range from about 0 to about 4;
$Na_2O$ in the range from about 0 to about 5;
$K_2O$ in the range from about 0 to about 4;
$ZrO_2$ in the range from about 0 to about 2;
$P_2O_5$ in the range from about 0 to about 7;
$Fe_2O_3$ in the range from about 0 to about 0.3;
MnOx in the range from about 0 to about 2;
$SnO_2$ in the range from about 0.05 to about 0.2;
a ratio $$\frac{[Li_2O + Na_2O + K_2O + MgO + ZnO]}{[Al_2O_3 + B_2O_3]}$$

in the range from about 0.7 to about 1.5; and a ratio:

$$\frac{[TiO_2 + SnO_2]}{[SiO_2 + B_2O_3]}$$

greater than about 0.04.

In one or more specific embodiments, the glass-ceramic article may include one or more β-spodumene solid solutions and an amorphous phase generated by ceramming a precursor glass article having a thickness of less than about 5 mm.

The glass-ceramic article may form at least a portion of an electronic device or a portable computing device, such as the enclosure of such devices.

A second aspect of the present disclosure pertains to a method of making a glass-ceramic article. In one or more embodiments, the method includes ceramming a precursor glass article having a thickness of less than about 5 mm or about 2 mm or less by
a) heating the at a rate in the range from about 1° C./minute to about 10° C./minute to a nucleating temperature (Tn) in the range from about 700° C. to about 810° C.,
b) maintaining the precursor glass article at the Tn to produce a nucleated precursor glass article,
c) heating the nucleated precursor glass article at a rate in the range from about 1° C./minute to about 10° C./minute to a crystallization temperature (Tc) in the range from about 850° to about 1250° C.,
d) maintaining the nucleated precursor glass article at the Tc to produce a glass-ceramic article having a crystalline phase, and
e) cooling the glass-ceramic article to about room temperature at an average rate in the range from about 10° C./minute to about 25° C./minute.

In one or more embodiments, ceramming the precursor glass article occurs over a total duration of less than about 4 hours. The precursor glass article may be formed by a rolling process.

In one or more embodiments, the method may also include ion exchanging the glass-ceramic article to generate a compressive stress layer and a depth of compressive stress layer as otherwise disclosed herein. The glass-ceramic articles made according to the methods described herein exhibit a Vickers crack initiation threshold of at least 15 kgf.

Numerous other aspects of embodiments, embodiments, features, and advantages of this disclosure will appear from the following description and the accompanying drawings. In the description and/or the accompanying drawings, reference is made to exemplary embodiments of this disclosure which can be applied individually or combined in any way with each other. Such embodiments do not represent the full scope of this disclosure. Reference should therefore be made to the claims herein for interpreting the full scope of this disclosure. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a recitation in this disclosure of a range of from about 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of this disclosure will become apparent from the following description, the accompanying drawings, and the appended claims.

BRIEF DESCRIPTION OF THE FIGURES

FIG. 1 graphically shows the Vickers indentation crack initiation threshold of Comparative Example A and Examples B-E;

FIGS. 2A-2C show images of the indentation formed from a Vickers indenter under a 10-kgf load and a 20-kgf load of Comparative Example A and Example E;

FIGS. 3A-3C show scanning electron microscope (SEM) backscattered electron image (BEI) micrographs of Comparative Example F;

FIGS. 4A-4C show SEM BEI micrographs of Comparative Example G;

FIGS. 5A-5C show SEM BEI micrographs of Example H;

DETAILED DESCRIPTION

Figure 6:
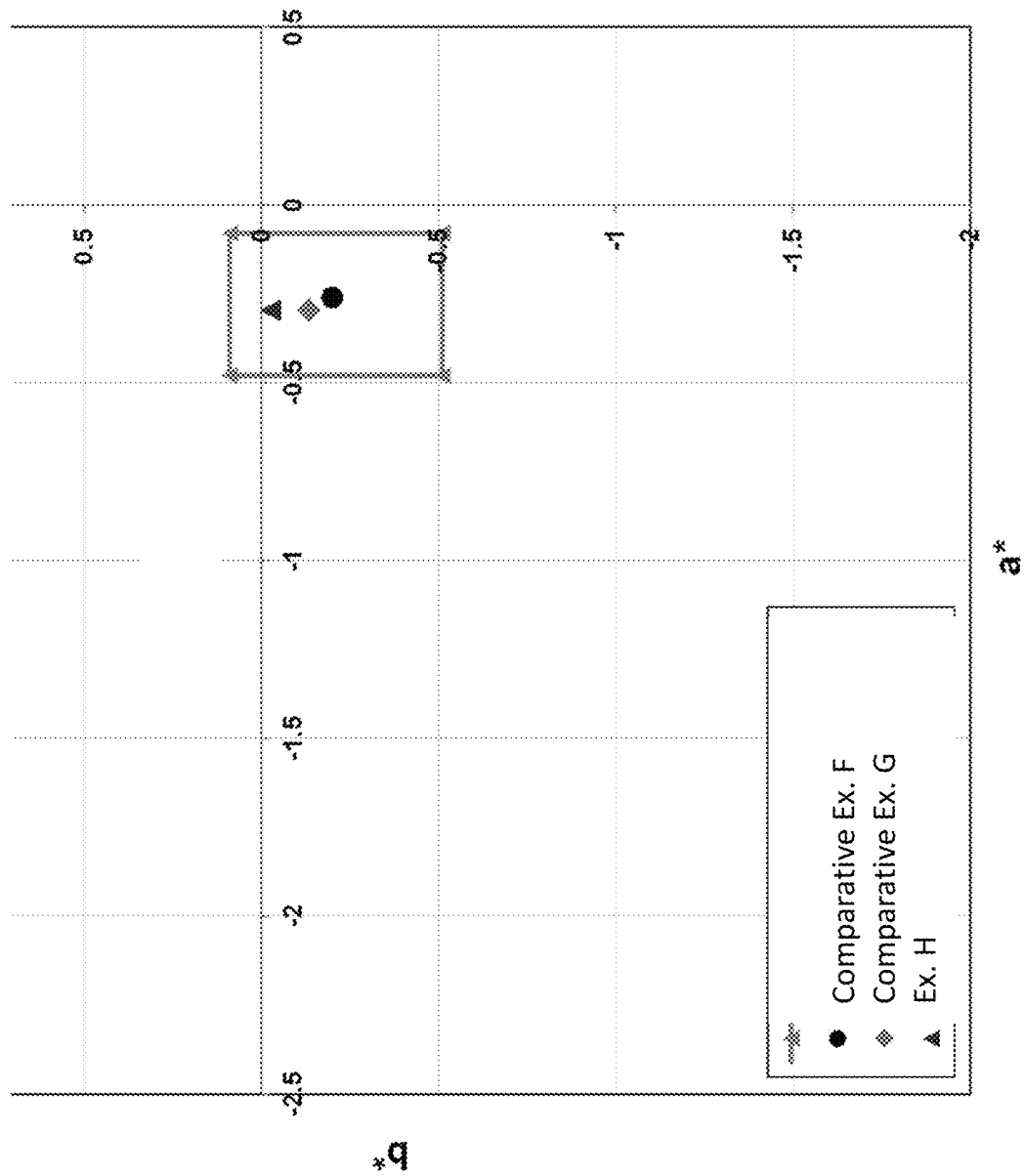
FIG. 6 illustrates the CIELAB a* and b* color coordinates, measured using F02 illuminant, with specular reflectance included, of Comparative Examples F and G and Example H.

In the following description of exemplary embodiments of this disclosure, reference is made to the accompanying drawings that form a part hereof, and in which are shown by way of illustration specific embodiments in which this disclosure may be practiced. While these embodiments are described in sufficient detail to enable those skilled in the art to practice this disclosure, it will nevertheless be understood that no limitation of the scope of this disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other embodiments may be utilized, logical changes (e.g., without limitation, any one or more of chemical, compositional {e.g., without limitation, any one or more of chemicals, materials, and the like}, electrical, electrochemical, electromechanical, electro-optical, mechanical, optical, physical, physiochemical, . . . and the like) and other changes may be made without departing from the spirit or scope of this disclosure. Accordingly, the following description is not to be taken in a limiting sense and the scope of embodiments of this disclosure is defined by the appended claims. It is also understood that terms such as "top," "bottom," "outward," "inward," . . . and the like are words of convenience and are not to be construed as limiting terms. Also, unless otherwise specified herein, a range of values includes both the upper and lower limits of the range. For example, a range of between about 1-10 mole % includes the values of 1 mole % and 10 mole %.

As noted, various embodiments of this disclosure relate to an article and/or machine or equipment formed from and/or including the embodiments of the glass-ceramics and precursor glasses disclosed herein. The glass-ceramic articles may be described as white and opaque. In some embodiments, the glass-ceramics may be described as ion exchangeable (or capable of being ion exchanged to then include a compressive stress layer) or as ion exchanged (as having been ion exchanged and including a compressive stress layer). The precursor glasses described herein may also be described as ion exchangeable (or capable of being ion exchanged to then include a compressive stress layer) or as ion exchanged (as having been ion exchanged and including a compressive stress layer). Such glass-ceramics and/or precursor glasses may be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD), plasma display panel (PDP), etc.), game controllers, tablets, thumb drives, external drives, and whiteboards; personal digital assistants; portable navigation devices; portable inventory devices; entertainment devices and/or centers and related accessories such as, tuners, media players (e.g., record, cassette, disc, solid-state . . . etc.), cable and/or satellite receivers, keyboards, monitors, and game controllers; electronic reader devices or e-readers; and mobile or smart phones. The glass-ceramics and/or precursor glasses may also be used in automotive, appliances, and architectural applications. To that end, it is desirable that the precursor glasses are formulated to have a sufficiently low softening point and/or a sufficiently low coefficient of thermal expansion so as to be compatible with manipulation into complex shapes.

One or more embodiments of this disclosure relate to glass-ceramics that exhibit improved mechanical properties, such as crack resistance. In particular, one or more embodiments disclosed herein relate to glass-ceramics exhibiting improved crack resistance, as measured through indentation fracture threshold methods, while maintaining other desirable properties such as a white, opaque color.

In one or more embodiments, the glass-ceramic may exhibit a crack resistance, as measured through a Vickers indentation fracture threshold test. Indeed, the Vickers indentation crack initiation threshold, as measured by the Vickers indentation fracture threshold test, may be at least about 15 kgf, at least about 16 kgf, at least about 17 kgf, at least about 18 kgf, at least about 19 kgf, at least about 20 kgf, at least about 21 kgf, at least about 22 kgf, at least about 23 kgf, at least about 24 kgf, at least about 25 kgf, at least about 26 kgf, at least about 27 kgf, at least about 28 kgf, at least about 29 kgf, or at least about 30 kgf. In some embodiments, the glass-ceramic exhibits a Vickers crack initiation threshold in the range from about 15 kgf to about 20 kgf, in the range from about 20 kgf to about 25 kgf, or in the range from about 25 kgf to about 30 kgf. The glass-ceramics may be chemically strengthened to form IX glass-ceramics exhibiting the foregoing Vickers indentation crack initiation threshold values and/or ranges.

In one or more embodiments, the glass-ceramic may include a crystalline phase and an amorphous phase generated by ceramming a precursor glass article (including a crystallizable glass) having a thickness of less than about 5 mm. For example, the precursor glass article may have a thickness of about 4 mm or less, about 3.8 mm or less, 3.6 mm or less, 3.4 mm or less, 3.2 mm or less, 3 mm or less, 2.8 mm or less, 2.6 mm or less, 2.4 mm or less, 2.2 mm or less, 2 mm or less, 1.8 mm or less, 1.6 mm or less, 1.4 mm or less, 1.2 mm or less, 1 mm or less and all ranges and sub-ranges therebetween.

The glass-ceramic of one or more embodiments may include a crystalline phase that is about 20 wt % of the glass-ceramic article or greater. In some embodiments, the crystalline phase is at least about 20 wt %, about 30 wt %, about 40 wt %, about 50 wt %, about 60 wt %, about 70 wt %, about 80 wt % or even about 90 wt %.

One or more embodiments include glass-ceramics that have been chemically strengthened. Such IX glass-ceramics exhibit a fracture toughness of greater than 0.8 MPa·m$^{1/2}$; alternatively, greater than 0.85 MPa·m$^{1/2}$; or then again, greater than 1 MPa·m$^{1/2}$. Independent of or in combination with the stated fracture toughnesses, such IX glass-ceramics exhibit a MOR of greater than 40,000 psi or, alternatively, greater than greater than 50,000 psi.

In one or more embodiments, the glass-ceramics are opaque and/or white in color. According to some embodiments of this disclosure, the white, opaque, glass-ceramics may include β-spodumene as the predominant crystalline phase. In one or more embodiments, the white, opaque, glass-ceramics may include, in mole %: 62-75 Si $O_2$;

10.5-17 $Al_2O_3$; 5-13 $Li_2O$; 0-4 ZnO; 0-8 MgO; 2-5 $TiO_2$; 0-4 $B_2O_3$; 0-5 $Na_2O$; 0-4 $K_2O$; 0-2 $ZrO_2$; 0-7 $P_2O_5$; 0-0.3 $Fe_2O_3$; 0-2 MnOx; and 0.05-0.2 $SnO_2$, while in alternative aspects, in mole %, including: 67-74 $SiO_2$; 11-15 $Al_2O_3$; 5.5-9 $Li_2O$, 0.5-2 ZnO; 2-4.5 MgO; 3-4.5 $TiO_2$; 0-2.2 $B_2O_3$; 0-1 $Na_2O$; 0-1 $K_2O$; 0-1 $ZrO_2$; 0-4 $P_2O_5$; 0-0.1 $Fe_2O_3$; 0-1.5 MnOx; and 0.08-0.16 $SnO_2$.

In some aspects, such glass-ceramics exhibit the following compositional criteria:

(1) the ratio of $$\frac{\text{the mole sum total of } [Li_2O + Na_2O + K_2O + MgO + ZnO]}{\text{the mole sum total of } [Al_2O_3 + B_2O_3]} \text{ to}$$

can be in the range from about 0.7 to about 1.5 and in some alternative aspects in the range from about 0.75 to about 1.5 while in other alternative aspects between in the range from about 0.75 to about 1, from about 0.8 to about 1, from about 1 to about 1.5 and all ranges and sub-ranges therebetween; and (2) the ratio of:

$$\frac{\text{the mole sum total of } [TiO_2 + SnO_2]}{\text{the mole sum total of } [SiO_2 + B_2O_3]} \text{ to}$$

can be greater than 0.04 and in some alternative aspects greater than 0.05.

In some additional aspects, such glass-ceramics exhibit any one or more of the following crystal phase assemblage:

(1) β-spodumene solid solutions exhibiting $Li_2O:Al_2O_3:SiO_2$ ratios ranging from 1:1:4.5-1:1:8 or, alternatively, from 1:1:4.5-1:1:7, and comprising at least 70 wt % of the crystalline phase;

(2) at least one Ti-containing crystalline phase comprising:
  a. about 2.5-8 wt % of the crystalline phases of the glass-ceramic,
  b. an acicular morphology exhibiting a length ≥ about 50 nm, and
  c. rutile; and optionally, (3) one or more crystalline phases exhibiting a spinel structure and comprising 1-10 wt % of the crystalline phase.

In further aspects, such glass-ceramics exhibit opaqueness and/or an opacity ≥85% for a 0.8 mm thickness over the wavelength range of 400 nm-700 nm.

In still further aspects, the glass-ceramic exhibits various CIELAB color space coordinates for a CIE illuminant F02. In one or more embodiments, the glass-ceramic exhibits a level of lightness (L*) ranging between 88 and 97 (e.g., in the range from about 90 and 96.5), over the wavelength range from about 350 nm to about 800 nm. The glass-ceramic may exhibit a* values ranging between −3 and +3 and b* values ranging between −6 and +6. In some embodiments, the glass-ceramic exhibits a* values ranging between −2 and +2 and b* values ranging between −5.5 and +5.5. In one or more specific embodiments, the glass-ceramic may exhibit a* values ranging between −1 and +1 and b* values ranging between −4 and +4.

As noted, the glass-ceramic (or precursor glasses) of one or more embodiments may exhibit the compositional ratio $$\frac{[Li_2O + Na_2O + K_2O + MgO + ZnO]}{[Al_2O_3 + B_2O_3]}$$

in the range from about 0.7 to about 1.5, from about 0.75 to about 1.5, from about 0.75 to about 1, from about 0.8 to about 1, or from about 1 to about 1.5, and all ranges and sub-ranges therebetween. Applicants have found that by formulating the precursor glasses to have prespecified values of this ratio, the resulting glass-ceramics made using such precursor glasses can be made to have desired characteristics including compositions and/or amounts and/or structure of predominant crystalline phases and minor crystalline phases. For example, the modifier-to-alumina molar ratio can be prescribed so that a glass-ceramic includes one or more of β-spodumene, Ti-containing crystalline phases that include rutile, spinel solid solutions, and residual glass. One or more of β-spodumene, Ti-containing crystalline phases, and residual glass may be present in prescribed and desired amounts, while having prescribed and desired compositions and/or structures and/or distributions. To that end, the modifier-to-alumina molar ratio influences the properties and/or processing characteristics of the precursor glasses and, in turn, the properties and/or characteristics of glass-ceramics made therefrom. For example, the modifier-to-alumina molar ratio influences precursor glass composition's glass transition temperature (Tg), as well as nucleation temperature (Tn) ranges and/or the crystallization temperature (Tc) ranges for predominant crystalline phases (e.g., (β-spodumene) and minor crystalline phases (e.g., Ti-containing crystalline phases, spinel solid solutions, β-quartz . . . etc.) In this manner, the precursor glasses of one or more embodiments are formulated so that the value of this ratio allows for practical transforming schedules (e.g., nucleation and crystallization temperatures and/or times) while at the same time allowing for the formation of glass-ceramics characterized by prespecified color coordinates that can be repeatedly and reliably achieved.

As noted, glass-ceramics according to some embodiments of this disclosure exhibiting or having "β-spodumene solid solution as the predominant crystalline phase" (alternatively stated "β-spodumene ss as the predominant crystalline phase" or "β-spodumene as the predominant crystalline phase") means that β-spodumene solid solution constitutes greater than about 70 percent by weight (wt %) of the all the crystalline phases of a glass-ceramic. Non limiting examples of other possible crystalline phases of glass-ceramics according to some embodiments include: β-quartz solid solutions ("β-quartz ss" or "β-quartz"); β-eucryptite solid solutions ("β-eucryptite ss" or "β-eucryptite"); spinel solid solutions ("spinel ss" or "spinel", such as e.g., gahnite); Ti containing crystalline phases (such as e.g., rutile, anatase, magnesium titanates, such as karrooite ($MgTi_2O_5$), aluminum titanates, such as e.g., tielite ($Al_2TiO_5$), etc.); cordierites (such as e.g., $(Mg,Fe)_2Al_3(Si_5AlO_{18})$ to $(Fe,Mg)_2Al_3(Si_5AlO_{18})$), and the like.

A predominance of β-spodumene solid solution in β-spodumene glass-ceramics according to some embodiments of this disclosure can be beneficial when such glass-ceramics are subjected to one or more ion exchange treatments to produce ion exchanged glass-ceramics. For example, the structure of β-spodumene can exhibit flexibility without a breakdown of the framework when Li ions are exchanged for a variety of cations (e.g., ions of Na, K, Rb . . . etc.).

As disclosed herein, some embodiments of the glass-ceramics can be characterized as being opaque and/or being white. In such cases, the desired opacity and/or desired whiteness levels can be achieved by including one or more Ti-containing crystalline phases, which include rutile, as a minor crystalline phase. In some embodiments, the glass-ceramics are β-spodumene glass-ceramics that include one or more Ti-containing crystalline phases, which include rutile, as a minor crystalline phase. Example of such one or more Ti-containing crystalline phases include any of rutile ($TiO_2$) and, optionally, can include one or more of anatase ($TiO_2$), karrooite ($MgTi_2O_5$), tielite ($Al_2TiO_5$) . . . etc., and mixtures thereof. When it is desirable to achieve a desired opacity and desired whiteness levels, Applicants have found that to achieve a desired degree of opacity and whiteness such glass-ceramics, such as β-spodumene glass-ceramics, include one or more Ti-containing crystalline phases, which include rutile, can be acicular crystals exhibiting in some aspects a length ≥50 nm, in other aspects a length ≥110 nm, and in still other aspects a length ≥1 μm, while in some instances up to 2 m.

Spinels are crystalline oxides having the generic formula $AB_2O_4$ and the basic spinel structure that is cubic. The prototype spinel structure is that of magnesium aluminate ($MgAl_2O_4$). In the basic spinel structure, O-atoms fill the sites of a face centered cubic (FCC) array; A-atoms occupy some of tetrahedral sites (A-sites) in the FCC structure; and B-atoms occupy octahedral sites (B-sites) in the FCC structure. In the normal spinels, the A and B atoms are different, A is a +2 ion and B is a +3 ion. In disordered spinels the +2 ions and +3 ions are randomly distributed over the A-sites and B-sites. In inverse spinels the A-sites are occupied by +3 ions with the consequence that the B-sites have an equal mixture of +2 ions and +3 ions and the A and B atoms can be the same. In some instances some A-sites can be occupied by +2 ions, +3 ions, and/or +4 ions while in the same or other instances B-sites can be occupied by +2 ions, +3 ions, and/or +4 ions. Some examples of A-atoms include zinc, nickel, manganese, magnesium, iron, copper, cobalt . . . etc. Also some examples of B-atoms include aluminum, antimony, chromium, iron, manganese, titanium, vanadium . . . etc. A wide range of solid solutions are common in spinels and can be represented by the generic formula $(A_x^1 A_{1-x}^2)[B_y^1 B_{2-y}^2]O_4$. For example, complete solid solution is obtained between $ZnAl_2O_4$ and $MgAl_2O_4$, which can represented by the formula $(Zn_x^1 Mg_{1-x}^2)Al_2O_4$. According to some embodiments of this disclosure, glass-ceramics include one or more crystalline phases exhibiting a spinel structure, which in aspects have compositions close to that of gahnite, $ZnAl_2O_4$. Also it has been found that as the amounts of ZnO or ZnO and $Al_2O_3$ are increased, such glass-ceramics can have increased amounts of gahnite. The refractive index (n) of gahnite can range between 1.79-1.82, which can be higher than that of β-spodumene (n=between 1.53-1.57) but significantly less than that of rutile (n=between 2.61-2.89). Also, in contrast to β-spodumene and rutile that are tetragonal, being cubic spinels can exhibit no birefringence. Therefore, in some embodiments, spinels in general and Zn-containing spinels in particular may have less of influence on color of glass-ceramics than would rutile.

In aspects of embodiments of this disclosure when glass-ceramics are β-spodumene glass ceramics and include Ti-containing crystalline phases comprising rutile, the rutile can range between 2.5 wt % to 6 wt % of the crystalline phases. Applicants have found that by maintaining rutile as at least 2.5 wt % of the crystalline phases minimum desired opacity levels can be ensured while by maintaining rutile as 6 wt % or less of the crystalline phases desired opacity levels can be maintained while at the same time desired white levels can be ensured. Stated differently, the $TiO_2$ content of β-spodumene glass-ceramics can range between 2-5 mole % and by maintaining at least 2 mole % minimum desired opacity levels can be ensured while by maintaining 5 mole % or less desired opacity levels can be maintained while at the same time desired white levels can be ensured.

For comparison, the refraction index (n) in descending order for several materials follows: rutile (n=between 2.61-2.89); anatase (n=between 2.48-2.56); diamond (n=between 2.41-2.43); gahnite (n=between 1.79-1.82); sapphire (n=between 1.75-1.78); cordierite (n=between 1.52-1.58); β-spodumene (n=between 1.53-1.57); and residual glass (n=between 1.45-1.49). Also for comparison, the birefringence (Δn) in descending order for the some of the same materials follows: rutile (Δn=between 0.25-0.29); anatase (Δn=0.073); sapphire (Δn=0.008); cordierite (Δn=between 0.005-0.017); diamond (Δn=0); and gahnite (Δn=0). Based on the above data, it can be seen that some of the Ti-containing crystalline phases, and rutile in particular, are among the materials exhibiting some of the highest refractive indices. In addition, another it can be seen that the some of the Ti-containing crystalline phases, and rutile in particular, their relatively high birefringence (Δn), a result of the anisotropic character of their tetragonal crystal structure. As a difference in either refractive index or birefringence increases among a predominant crystalline phase (e.g., β-spodumene {n=between 1.53-1.57}) and/or any residual glass (n=between 1.45-1.49) and any minor crystalline phases of glass-ceramics scattering of visible wavelengths can increase in turn increasing opacity. A difference in each characteristic alone can be beneficial while a difference in both even more be even more so. Given the differences in both among some of the Ti-containing crystalline phases, and rutile in particular, and the base phase(s) (β-spodumene and any residual glass), the β-spodumene glass-ceramics of the present disclosure exhibit desirable level scattering that can be relatively high and, thus the requisite and desired opacity that likewise can be high.

$Al_2O_3$ contributes to the β-spodumene glass-ceramics of the present disclosure exhibiting β-spodumene as the predominant crystalline phase. As such, a minimum of 10.5 mole % $Al_2O_3$ is desired. Above 17 mole % $Al_2O_3$ is undesirable as the resultant mullite liquidus makes it difficult to melt and form precursor glasses.

Including $Na_2O$ and $K_2O$ can reduce the melting temperature of the precursor glasses and/or enable shorter crystallization cycles.

Glass-ceramics of the present disclosure contain 0-4 mole % $B_2O_3$. Precursor glasses typically can be melted at a temperature below 1600° C., in certain aspect and/or embodiments below about 1580° C. while in certain other aspect and/or embodiments below about 1550° C., making it possible to melt in a relatively small commercial glass tank. The inclusion of $B_2O_3$ is conducive to the low melting temperature.

MgO and ZnO can act as fluxes for precursor glasses. As such, a minimum mole % sum [MgO+ZnO] of 2 mole % is desired to obtain a glass melting temperature below 1600° C. Ions of Mg and, to a lesser extent, ions of Zn can participate in the β-spodumene of the β-spodumene glass-ceramics.

Maintaining $Li_2O$ between 5-13 mole % in precursor glasses encourages the formation of β-spodumene solid solution crystalline phases. Also, $Li_2O$ acts as a flux to decrease the melting point of the precursor glasses. As such, a minimum of 5 mole % $Li_2O$ is desired in order to obtain the desired β-spodumene phase. Above 13 mole % $Li_2O$ can be undesirable as unwelcome phases, such as, lithium silicates . . . etc., might result during the formation of glass-ceramics.

An appropriate types and amount of one or more nucleation agents is included in precursor glasses to facilitate nucleation and/or growth of at least β-spodumene as the predominant crystalline phase and any desired one or more minor crystalline phases during the nucleation and/or crystallization heat treatments. Among appropriate types of one or more nucleation agents are $TiO_2$ and $ZrO_2$. In some embodiments, up to 6 mole % or $TiO_2$ may be utilized and/or up to about 2 mol % of $ZrO_2$ may be utilized. A small amount of $SnO_2$ may appear to enter the rutile phase in solid solution and, as such, might contribute to nucleation. In one or more embodiments, $TiO_2$ may be utilized as a nucleation agent where the formation of one or more Ti-containing phases is desired to achieve a prescribed degree of opacity and whiteness levels. In other embodiments, $ZrO_2$ may be utilized as a nucleation agent to increase nucleation efficiency. Thus, types and amount of one or more nucleation agents is carefully prescribed. It is noted that in certain aspect and/or embodiments relating to β-spodumene glass-ceramics (optionally exhibiting (β-quartz solid solution), a minimum mole % sum $[TiO_2+SnO_2]$ in excess of 2.5 mole % is desired as an ingredient of precursor glasses. In other words, effective amounts of this mole % sum $[TiO_2+SnO_2]$ are formulated as an ingredient of precursor glasses so that nucleation in an effective manner occurs and growth is achieved to a preselected and appropriate crystal phase assemblage. It is noted that above 6 mole % $TiO_2$ is undesirable as the resultant high rutile liquidus has the potential of increasing difficulties during shape forming of precursor glasses. Also, it is noted that an inclusion of $SnO_2$, in addition to its possible minor contribution to nucleation, can partially function as a fining agent during a manufacture of precursor glasses to contribute to their quality and integrity.

Maintaining the ratio:

$$\frac{[TiO_2 + SnO_2]}{[SiO_2 + B_2O_3]}$$

in some aspects greater than 0.04 and, in some alternative aspects, greater than 0.05 can contribute to achieving preselected and appropriate crystal phase assemblages that, in turn, contributes to achieving prescribed degrees of opacity and/or whiteness levels.

Also in β-spodumene glass-ceramics and/or the precursor glasses according to embodiments, applicant have found that β-spodumene crystalline phases exhibiting a $Li_2O:Al_2O_3$:$nSiO_2$ ratio between 1:1:4.5-1:1:8 to be desirable. As such, a minimum ratio of 1:1:4.5 is desired to avoid the formation of excessive levels of the unstable residual glass in the resultant β-spodumene glass-ceramics. Above a ratio of 1:1:8 is undesirable as issues with that meltability of precursor glasses can arise.

Other properties that can be exhibited by β-spodumene glass-ceramics according to one or more embodiments of this disclosure include one or more of:

(1) radio and microwave frequency transparency, as defined by a loss tangent of less than 0.03 and at a frequency range of between 15 MHz to 3.0 GHz;
(2) a fracture toughness greater than 1 $MPa \cdot m^{1/2}$;
(3) a Modulus of Rupture (MOR) greater than 20,000 psi;
(4) a Knoop hardness of at least 400 $kg/mm^2$;
(5) a thermal conductivity of less than 4W/m° C.; and
(6) a porosity of less than 0.1 vol %.

In one or more embodiments relating to articles in general and electronic device housings or enclosures in particular (each partially or completely comprised of β-spodumene glass-ceramics), such articles and/or β-spodumene glass-ceramics exhibit radio and microwave frequency transparency, as defined in some aspects by a loss tangent of less than 0.02; in alternative aspects of less than 0.01; and in still further aspects of less 0.005, the loss tangent determined over a frequency ranging from 15 MHz to 3.0 GHz at about 25° C. This radio and microwave frequency transparency feature can be especially beneficial for wireless hand held devices that include antennas internal to the enclosure. This radio and microwave transparency allows the wireless signals to pass through the housings or enclosures and in some cases enhances these transmissions. Additional benefits can be realized when such articles and/or β-spodumene glass-ceramics exhibit a dielectric constant determined over a frequency ranging from 15 MHz to 3.0 GHz at about 25° C. of less than about 10; alternatively, less than about 8; or then again, less than about 7 in combination with the above values of loss tangent.

Other embodiments of this disclosure relate to methods for forming precursor glasses, which may be formulated to be precursor to the glass-ceramics described herein. In some embodiments, the method includes melting a mixture of raw materials formulated to produce upon melting the precursor glasses described herein. In some embodiments, the precursor glasses may include, in mole %, including: 62-75 Si $O_2$; 10.5-17 $Al_2O_3$; 5-13 $Li_2$ O; 0-4 ZnO; 0-8 MgO; 2-5 $TiO_2$; 0-4 $B_2O_3$; 0-5 $Na_2O$; 0-4 $K_2O$; 0-2 $ZrO_2$; 0-7 $P_2O_5$; 0-0.3 $Fe_2O_3$; 0-2 MnOx; and 0.05-0.2 $SnO_2$, while in alternative aspects, in mole %, including: 67-74 Si $O_2$; 11-15 $Al_2O_3$; 5.5-9 $Li_2$ O; 0.5-2 ZnO; 2-4.5 MgO; 3-4.5 $TiO_2$; 0-2.2 $B_2O_3$; 0-1 $Na_2O$; 0-1 $K_2O$; 0-1 $ZrO_2$; 0-4 $P_2O_5$; 0-0.1 $Fe_2O_3$; 0-1.5 MnOx; and 0.08-0.16 $SnO_2$.

In additional aspects, such mixture of raw materials is formulated to produce, upon melting, precursor glasses exhibiting the following compositional criteria:

(1) the ratio of $$\frac{\text{the mole sum total of } [Li_2O + Na_2O + K_2O + MgO + ZnO]}{\text{the mole sum total of } [Al_2O + B_2O_3]}$$

can be in the range from about 0.7 to about 1.5 and in some alternative aspects in the range from about 0.75 to about 1.5 while in other alternative aspects between in the range from about 0.75 to about 1, from about 0.8 to about 1, from about 1 to about 1.5 and all ranges and sub-ranges therebetween and (2) the ratio of:

$$\frac{\text{the mole sum total of } [TiO_2 + SnO_2] \text{ to}}{\text{the mole sum total of } [SiO_2 + B_2O_3]}$$

can be greater than 0.04 and in some alternative aspects greater than 0.05. In still other aspects, such mixture of raw materials is formulated to produce the above precursor glasses upon fining and homogenization molten glass compositions at a temperature below about 1600° C.

In one or more embodiments, the raw materials may be selected to have a low iron content to provide improved properties such to provide an essentially white glass-ceramic. In other embodiments, sand may be utilized as the SiO2 source. To reduce the level of iron in the sand and other batch materials, prior acid treatment may be necessary. In one or more embodiments, the treatment of the batch materials should not introduce iron oxides, if low iron content is desired. In one or more alternative embodiments, the iron content may not need to be controlled. Anhydrous boric acid may be used as the source of $B_2O_3$. Spodumene, fine alumina, and Al-metaphosphate may be used as the starting materials. One skilled in the art can calculate the amount of batch materials used according to the projected final composition of the glass-ceramic. As mentioned above, a fining agent that has been found to be beneficial is $SnO_2$ in an amount between about 0.05-0.15 mole %.

The mixed batch materials are then charged into a glass tank and melted according to conventional glass melting process. One skilled in the glass melting art can adjust the composition of the batch within the above described compositional range to fine tune the melting ease of the glass in order to accommodate the operating capacity and temperature of the glass melting tank. The molten glass can be homogenized and fined using conventional methods.

The homogenized, fined and thermally uniform molten glass is then formed into a glass sheet. Generally, the glass should be formed at a viscosity lower than the liquidus viscosity (hence a temperature higher than the liquidus temperature).

In one or more embodiments, the method includes forming molten precursor glasses into a glass article having a thickness along a major dimension of less than about 5 mm (e.g., in the range from about 0.5 mm up to about 5 mm). The glass article may be a glass sheet, though other shapes are contemplated. In one or more embodiments, the glass sheet may be formed by a rolling process in which the glass sheet has a thickness of about less than 5 mm. The glass sheet may be formed by other methods like float processes, spinning processes or even pressing processes (e.g., for relatively small pieces with a sufficient thickness). The length and height dimensions of the glass sheet may be varied. For example, the sheet can have length and/or width dimensions of up to about 500 mm or even 1500 mm and combinations thereof.

In one or more embodiments, the glass sheet may be formed using a process and apparatus in which a glass feed device supplies the molten precursor glass at a temperature of about 1000° C. or greater to a pair of forming rolls that are maintained at a surface temperature of about 250° C. or higher or, in some embodiments, about 500° C. or greater or about 600° C. or greater. The hot forming rolls may be located vertically below the glass feed device to receive the molten precursor glass. The hot forming rolls form the supplied molten precursor glass into a formed ribbon of glass having a thickness near a desired thickness (e.g., less than about 5 mm or less). The process and apparatus may include a pair of sizing rolls maintained at a surface temperature of about 600° C. or less, 400° C. or less, 300° C. or less, or 200° C. or less that are located vertically below the hot forming rolls to receive the formed ribbon of glass. The cold sizing rolls further thins the formed ribbon of glass to produce a sized ribbon of glass having the desired thickness (e.g., 4 mm or less) and desired thickness uniformity (e.g., ±0.025 mm). In one or more embodiments, the process and apparatus may include use of a pair of pulling rolls that are located vertically below the sizing rolls for receiving the sized ribbon of glass and creating a tension on the sized ribbon of glass. Other processes and apparatus may be utilized to form the glass sheet described herein, for example, the processes and apparatus described in the following: PCT Publication No. WO 2012/166761, entitled "Precision Glass Roll Forming Process and Apparatus", PCT Publication No. WO2009/070236, filed on May 30, 2012, entitled "Apparatus And Method For Producing Sheets Of Glass Presenting At Least One Face Of Very High Surface Quality", PCT Publication No. 2010/096630, filed on Nov. 20, 2008, entitled "Glass Manufacturing System And Method For Forming A High Quality Thin Glass Sheet", PCT Publication No. WO2011/022661, filed on Aug. 20, 2010, entitled "Crack And Scratch Resistant Glass And Enclosures Made Therefrom", PCT Publication No. WO13/012513, filed on Jun. 20, 2012, entitled "Microwave-Based Glass Laminate Fabrication", European Patent Application No. EP12306484.2, filed Nov. 29, 2012, entitled "Precision Forming Of Sheet Glass And Sheet Rolling Apparatus", and U.S. Provisional Patent Application No. 61/858,295, filed Jul. 25, 2013, entitled "Methods And Apparatus For Forming A Glass Ribbon", the contents of which are incorporated herein by reference in their entirety.

In further aspects, some other methods included methods for forming glass-ceramics by transforming the glass sheets into glass-ceramics in a ceramming cycle that is about 6 hours or less, about 5 hours or less, about 4 hours or less or even about 3 hours or less. As used herein, the term "ceramming cycle" includes heating the glass sheet to a nucleation temperature (Tn), maintaining the glass sheet at the nucleation temperature to form a nucleated glass sheet, heating the nucleated glass sheet a crystallization temperature (Tc), maintaining the nucleated glass sheet at the crystallization temperature to form the glass-ceramic and cooling the glass-ceramic to room temperature. In one or more embodiments, the step of cooling the glass-ceramic to room temperature may be performed at an average rate of about 10° C./minute or greater, about 11° C./minute or greater, about 12° C./minute or greater, about 13° C./minute or greater, about 14° C./minute or greater, about 15° C./minute or greater, about 16° C./minute or greater, about 17° C./minute or greater, about 18° C./minute or greater, about 19° C./minute or greater, or about 20° C./minute or greater. In a specific embodiment, the glass-ceramic is cooled to room temperature at an average rate in the range from about 10° C./minute to about 20° C./minute, from about 10° C./minute to about 15° C./minute, from about 15° C./minute to about 20° C./minute or greater and all ranges and subranges therebetween. In some embodiments, the cooling rate may vary as the glass-ceramic is cooled to specific temperatures or temperature ranges. For example, the glass-ceramic may be cooled at different rates within the rates disclosed herein (e.g., a rate of about 10° C./minute or greater, about 15° C./minute or greater, about 20° C./minute or greater or in the range from about 10° C./minute to about 20° C./minute), as the glass-ceramic cools from about 950° C. to room temperature, about 925° C. to room temperature, about 900° C. to room temperature, 875° C. to room temperature, 850° C. to room temperature, 825° C. to room temperature, and/or 800° C. to room temperature, and all ranges and sub-ranges therebetween.

In one or more embodiments, the glass-ceramic is cooled at the foregoing cooling rates as it is moved on a conveyor system or rolling system through the cooling segment of the ceramming cycle at a speed of about 0.15 m/minute or greater. In other embodiments, the speed of the conveyor system or rolling system can be modified to provide the cooling rates disclosed herein. In one or more embodiments, the ceramming cycle may be performed in a static furnace and in such embodiments, the cooling rates disclosed herein may be utilized by, for example, cooling the furnace rapidly or opening the furnace at the end of the temperature hold and quenching the glass-ceramic as disclosed herein.

In one or more embodiments, the method includes ceramming the glass sheets disclosed herein and having a thickness of less than about 5 mm using a ceramming cycle in which the formed glass-ceramic is cooled at an average rate of 15° C./minute or greater, from a temperature, which is equal to or less than the Tc, to room temperature. In one or more embodiments, the methods including (i) heating a glass sheet comprising a precursor glass at a rate of 1-10° C./min to a nucleation temperature (Tn) ranging between 700 and 810° C. where nuclei start to form; (ii) maintaining the glass article comprising and/or the precursor glass at the nucleation temperature for a duration of about 2 hours or less, 1.5 hours or less, or even 1 hour or less to produce a nucleated glass sheet; (iii) heating the nucleated glass sheet at a rate of 1-10° C./min to a crystallization temperature (Tc) ranging between 850° C. and 1250° C. to begin crystallization; (iv) maintaining the glass sheet at the crystallization temperature for a duration of less than about 5 hours to allow crystallization to reach a desired extent and to produce a glass-ceramic; and (v) cooling the glass-ceramic from a temperature equal to or less than Tc to room temperature at an average rate of about 15° C./min or greater or about 20° C./minute or greater. In one or more embodiments, cooling the glass-ceramic to room temperature may take at least about 45 minutes, at least about 60 minutes or up to 90 minutes. In one or more embodiments, the glass-ceramic may be cooled to room temperature for a duration in the range from about 45 minutes to about 90 minutes. In one or more specific embodiments, the cooling step has a duration of about 45 minutes or less. In some embodiments, the length of time to cool the glass-ceramic to room temperature may be dependent on the ceramming cycle length. Known ceramming cycles include cooling the glass-ceramic to room temperature in a furnace. In some embodiments of the present disclosure, the glass-ceramic is initially cooled to a temperature from about 950° C. to about 800° C. In some embodiments, the glass-ceramic may be initially cooled from 950° C. to about 800° C. in a furnace for about 5 minutes to about 35 minutes. The glass-ceramic may thereafter be rapidly cooled using a rapid quenching process that cools the glass-ceramic at a rate in the range from about 300° C./minute to about 500° C./minute. In some embodiments, the rapid quenching process cools the glass-ceramic at a rate of about 325° C./minute, 350° C./minute, 375° C./minute, 400° C./minute, 425° C./minute, 450° C./minute, 475° C./minute, 500° C./minute, 525° C./minute, 550° C./minute and all ranges and sub-ranges therebetween. In some specific embodiments, the rapid quenching process utilizes an electric fan, a cold steel or a cold liquid. In some embodiments, the rapid quenching process includes directing air from the electric fan at the largest surface area of the glass-ceramic. In other embodiments, at least the largest surface area of the glass-ceramic may be placed in contact with the cold or low temperature steel or a cold or low temperature liquid in the rapid quenching process.

Temperature-temporal profile of steps (iii) and (iv), in addition to a precursor glasses, are judiciously prescribed so as to produce the desired crystalline phase (e.g., β-spodumene solid solution as a predominant crystalline phase and/or one or more Ti-containing crystalline phases, which include rutile, as one or more minor crystalline phases); desired proportions of the predominate crystalline phase and/or minor crystalline phase(s) and residual glass; desired crystal phase assemblages of the predominate crystalline phase and/or minor crystalline phase(s) and residual glass; desired grain sizes or grain size distributions among the predominate crystalline phase and/or minor crystalline phase(s); and, hence the final integrity, quality, color, and/or opacity, of resultant glass-ceramics and/or glass-ceramic articles according to some embodiments of this disclosure.

Moreover, the temperature-temporal profile of step (v) may be controlled to produce the desired amorphous and/or crystalline phase, fictive amorphous phase, and mechanical properties of the glass-ceramic. For example, where the glass-ceramic is cooled on a conveyor system, the speed of the conveyor may be increased or decreased to control the cooling rate. In other embodiments, the length of the conveyor system may be modified to control the cooling rate of the glass-ceramic. The environment for cooling the glass-ceramic may also be modified. For example, the environmental temperature may be modified such that part of the cooling process may take place in a furnace or heated environment while other parts of the cooling process may take place in ambient air or in a cooled environment (e.g., by directing air from a fan, or by contacting the glass-ceramic with cold steel or cold liquid). These modifications may be adjusted and controlled to increase the crack resistance of the glass-ceramic.

To produce the glass-ceramic article of the present disclosure, the glass sheets prepared as described herein are placed into a crystallization kiln to undergo the crystallization process. The temperature-temporal profile of the kiln is desirably program-controlled and optimized to ensure that the glass sheets are formed into glass-ceramic articles having the desired crystalline phase (e.g., β-spodumene as the predominant crystalline phase). As described above, the glass composition and the thermal history during the crystallization process determine the final crystalline phases, their assemblage and crystallite sizes in the final product. Moreover, the ceramming cycle and/or temperature-temporal profiles can determine the mechanical properties such as the Vickers indentation crack initiation threshold. One skilled in the art can adjust Tn, Tc and the temperature-temporal profile of the crystallization cycle to accommodate the different glass compositions within the above-described range. The glass-ceramics of the present disclosure can advantageously exhibit an opaque white coloring.

The glass-ceramic article of the present disclosure may be further processed before its final intended use. One such post-processing includes IX treatment of the glass-ceramic to form an IX glass-ceramic article having at least a portion of at least one surface subjected to an IX process, such that the IX portion of the least one surface exhibits a compressive layer having a depth of layer (DOL) greater than or equal to about 1%, about 1.5%, or about 2% of the overall article thickness while exhibiting a compressive stress ($\sigma_s$) in the surface of at least 300 MPa. In some embodiments, the In one or more embodiments, the IX glass-ceramic article includes at least a portion of at least one surface subjected to an IX process, such that the IX portion of the least one surface exhibits a compressive layer having a depth of layer (DOL) greater than or equal to about 8%, about 9%, about 10%, about 11%, about 12%, about 13%, about 14% or about 16% of the overall article thickness. In one or more specific embodiments, DOL may be in the range from about 80 μm to about 120 μm. Any IX process known to those in the art might be suitable as long as the above DOL and compressive stress ($\sigma_s$) are achievable.

In a more particular embodiment the housing or enclosure exhibits an overall thickness of about 0.8 mm and compressive layer exhibiting a DOL of 40 μm with that compressive layer exhibiting a compressive stress ($\sigma_s$) of up to and including 500 MPa. Again any IX process which achieves these features is suitable.

It is noted that in addition to single step IX processes, multiple IX procedures might be utilized to create a designed IX profile for enhanced performance. That is, a stress profile created to a selected depth by using IX baths formulated with differing concentration of ions or by using multiple IX baths formulated using different ion species having different ionic radii.

As used herein, the term "ion exchanged" is understood to mean treating the heated β-spodumene glass-ceramic with a heated solution containing ions having a different ionic radius than ions that are present in the glass-ceramic surface and/or bulk, thus replacing those ions with smaller ions with the larger ions or vice versa depending on the ion exchange ("IX") temperature conditions. Potassium (K) ions, for example, could either replace, or be replaced by, sodium (Na) ions in the glass-ceramic, again depending upon the IX temperature conditions. Alternatively, other alkali metal ions having larger atomic radii, such as (Rb) rubidium or cesium (Cs) could replace smaller alkali metal ions in the glass-ceramic. Similarly, other alkali metal salts such as, but not limited to, sulfates, halides, and the like may be used in the ion exchange ("IX") process.

In the instant method, it is contemplated that both types of IX can take place; i.e., larger for smaller ions are replaced and/or smaller for larger ions are replaced. In one some embodiments, the method involves IX (particularly lithium-for-sodium ion exchange) the glass-ceramic by placing it in an $NaNO_3$ bath at temperatures between 310-430° C. for times up to 10 h. In other embodiments, the IX can be accomplished utilizing mixed potassium/sodium baths at similar temperatures and times; e.g., an 80/20 $KNO_3/NaNO_3$ bath or alternatively a 60/40 $KNO_3/NaNO_3$ at comparable temperatures. In still other embodiments, a two-step IX process is contemplated wherein the first step is accomplished in a Li-containing salt bath; e.g. the molten salt bath can be a high temperature sulfate salt bath composed of $Li_2SO_4$ as a major ingredient, but diluted with $Na_2SO_4$, $K_2SO_4$ or $Cs_2SO_4$ in sufficient concentration to create a molten bath. This IX step functions to replace the larger sodium ions in the glass-ceramic with the smaller lithium ions which are found in the Li-containing salt bath. The second IX step functions to exchange Na into the glass-ceramic and can be accomplished as above by a $NaNO_3$ bath at temperatures between 310° C. and 430° C.

Identity of the crystalline phases of crystal phase assemblages and/or crystal sizes of a crystalline phase of the glasses and glass-ceramics described herein were determined by X-ray diffraction (XRD) analysis techniques known to those in the art, using such commercially available equipment as the model as a PW1830 (Cu Kα radiation) diffractometer manufactured by Philips, Netherlands. Spectra were typically acquired for 2θ from 5 to 80 degrees.

Elemental profiles measured for characterizing surfaces of the precursor glasses and/or glass-ceramics were determined by analytical techniques know to those in the art, such as, electron microprobe (EMP); x-ray photoluminescence spectroscopy (XPS); secondary ion mass spectroscopy (SIMS); etc.

Compressive stress ($\sigma_s$) in a surface layer, average surface compression (CSavg), and depth of layer (DOL) of IX materials that are transparent can be conveniently measured using conventional optical techniques and instrumentation such as commercially available surface stress meter models FSM-30, FSM-60, FSM-6000LE, FSM-7000H . . . etc. available from Luceo Co., Ltd. and/or Orihara Industrial Co., Ltd., both in Tokyo, Japan. Flexural Strength of the precursor glasses and/or glass-ceramics can be characterized by methods known to those in the art, such as, those described in ASTM C1499 (and its progeny, all herein incorporated by reference) "Determination of Monotonic Equibiaxial Flexural Strength Advanced Ceramics," ASTM International, Conshohocken, Pa., US.

Vickers hardness of the precursor glasses and/or glass-ceramics can be characterized by methods known to those in the art, such as, those described in ASTM C1327 (and its progeny, all herein incorporated by reference) "Standard Test Methods for Vickers Indentation Hardness of Advanced Ceramics," ASTM International, Conshohocken, Pa., US.

Vickers indentation cracking threshold measurements of the precursor glasses and/or glass-ceramics can be characterized by methods known to those in the art, such as, by applying and then removing an indentation load to a Vickers indenter as described in ASTM C1327 to the surface of the material to be tested at a rate of 0.2 mm/min. The maximum indentation load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

EXAMPLES

The following examples illustrate the advantages and features of this disclosure and in are no way intended to limit this disclosure thereto Inasmuch as the sum of the individual constituents totals or very closely approximates 100, for all practical purposes the reported values may be deemed to represent mole %. The actual precursor glass batch ingredients may comprise any materials, either oxides, or other compounds, which, when melted together with the other batch components, will be converted into the desired oxide in the proper proportions.

TABLE 1

| | Composition | |
|---|---|---|
| Oxide [mole %] | 1 | 2 |
| $SiO_2$ | 69.1 | 69.39 |
| $Al_2O_3$ | 12.59 | 12.66 |
| $TiO_2$ | 3.6 | 3.5 |
| $Li_2O$ | 7.5 | 7.29 |
| ZnO | 1.81 | 1.7 |
| $B_2O_3$ | 1.84 | 1.85 |
| MgO | 2.86 | 2.96 |
| $Na_2O$ | 0.41 | 0.43 |
| $SnO_2$ | 0.2 | 0.18 |
| $K_2O$ | 0.05 | 0.038 |
| $\frac{[Li_2O + Na_2O + MgO + ZnO + K_2O]}{[Al_2O_3 + B_2O_3]}$ | $\frac{12.63}{14.43} = 0.88$ | $\frac{12.42}{14.51} = 0.86$ |
| $\frac{[TiO_2 + SnO_2]}{[SiO_2 + B_2O_3]}$ | $\frac{3.8}{71} = 0.054$ | $\frac{3.86}{71.24} = 0.052$ |

Examples A, B, C, D, E

The glass of Composition 1 was melted in an industrial furnace to form a molten glass that was formed, by rolling, into bars having a thickness of about 15 mm. Thin samples having a thickness of about 2 mm were prepared by machining the 15 mm-thick bars. The samples were cerammed in a static furnace using the heating schedule of Ceramming Cycle 1, provided below in Table 4; however, the samples were cooled using different cooling rates, as shown below in Table 2. Comparative Example A was cooled to room temperature in the static furnace at a rate of about 5° C./minute. Examples B-E were initially cooled in the furnace at the furnace rate (i.e., 5° C./minute) after reaching a specific temperature (i.e., a temperature of 800° C., 850° C., 900° C., 950° C., respectively) of either 800-950° C. range), Examples B-E were cooled by rapid electric fan quenching to room temperature. The estimated cooling rate of the rapid electric fan quenching is in the range from about 300° C. to about 500° C./min.

TABLE 2

| Example | Cooling |
|---|---|
| A (comparative) | Furnace rate (5° C./min) |
| B | cooling at furnace rate (5° C./min) to 800° C., followed by quenching from 800° C. to room temperature |
| C | cooling at furnace rate (5° C./min) to 850° C., followed by quenching from 850° C. to room temperature |
| D | cooling at furnace rate up (5° C./min) to 900° C., followed by quenching from 900° C. to room temperature |
| E | cooling at furnace rate up (5° C./min) to 950° C., followed by quenching from 950° C. to room temperature |

The cerammed and cooled samples were then ion-exchanged in a bath of sodium nitrate at 390° C. for 3.5 hours. Each of Examples A-E was subjected to a Vickers indentation cracking threshold test to determine the Vickers indentation crack initiation threshold, as described herein. The results are provided in FIG. 1. As shown in FIG. 1, the samples that were quenched (i.e., Examples B-E) exhibited a Vickers indentation crack initiation threshold of greater than 20 kgf, while the sample cooled in the furnace (i.e., Example A) exhibited a Vickers indentation crack initiation threshold of 9 kgf.

A sample of Comparative Example A was indented with a Vickers indenter using a 10-kgf force. A sample of Example E was indented with a Vickers indenter using a 10 kgf force and a sample of Example E was indented with a Vickers indenter using a 20-kgf force. FIGS. 2A-2C show images of the indentation in each sample. As shown in FIGS. 2A-2C, Example E, which was cooled at a faster rate withstood greater indentation loads and exhibiter greater densification prior to cracking, than Comparative Example A (which was cooled at a slower rate).

FIG. 1 and FIGS. 2A-2C demonstrate that a faster the cooling rate provides glass-ceramics that exhibit greater crack resistance as measured by the indentation fracture threshold test, than glass-ceramics that were cooled at slower rates.

Examples F-H

The exemplary precursor glasses (Compositions 1 and 2) listed in Table 1 were melted in an industrial furnace. Example F included a bar (having dimensions of 550 mm×65 mm×15 mm) formed from the molten precursor glass by rolling between a single pair of rolls, as described herein. Example G included a thick glass sheet (having dimensions of 1200 mm×600 mm×13 mm) formed from the molten precursor glass by continuous casting in a hollow mold. Example H included a thin rolled glass sheet (having dimensions of 500 mm×62 mm×1.24 mm) formed from the molten precursor glass by rolling between two, consecutive pairs of rolls. As summarized in Table 3, three samples each of Example F (comparative) and Example H were made from Composition 1; three samples each of Example G (comparative) were made from Composition 2. As also shown in Table 3, the samples were subjected to one of the ceramming cycles shown in Table 4, in a continuous rolling hearth. Thereafter, the samples were ion exchanged in a bath of sodium nitrate at 390° C. for 3.5 hours.

TABLE 3

|  | Composition for precursor glass sheet (referring to Table 1) | Precursor glass thickness | Ceramming Cycle (referring to Table 4) |
|---|---|---|---|
| Example F (comparative) | Composition 1 | 15 mm (glass bar) | 1 |
| Example G (comparative) | Composition 2 | 13 mm (thick glass sheet) | 2 |
| Example H | Composition 1 | 1.24 mm (thin rolled glass sheet) | 3 |

TABLE 4

|  | Ceramming cycle | | |
|---|---|---|---|
|  | Ceramming Cycle 1 | Ceramming Cycle 2 | Ceramming Cycle 3 |
| Heating time to 780° C. | 140 min | 93 min | 71 min |
| Time at 780° C. | 105 min | 97 min | 38 min |
| Heating time at maximum temperature | 40 min | 44 min | 35 min |
| Maximum temperature | 975° C. | 969° C. | 980° C. |
| Time at maximum temperature | 230 min | 110 min | 116 min |
| Time to cool to 50° C. | 108 min | 72 min | 54 min |
| Cooling rate | 8° C./min | 13° C./min | 17° C./min |

The resulting glass-ceramics of Examples F-H were analyzed for various properties, which are shown in Table 5. As shown in Table 5, the properties are similar or substantially the same, except for the Vickers indentation crack initiation threshold values exhibited by the Examples. All three samples of Examples F-H were subjected to a Vickers indentation cracking threshold and the average threshold values for Example F and H are shown in Table 5. The glass-ceramic of Example H exhibited much greater Vickers indentation crack initiation threshold as compared to Example F. As such, the faster cooling rate at the end of the ceramming cycle 3, in combination with the thin glass article precursor contribute to providing a glass-ceramic with improved mechanical properties and, specifically, improved crack resistance as indicated by its Vickers indentation crack initiation threshold.

TABLE 5

|  | Comparative Example F | Example H |
|---|---|---|
| Coefficient of Thermal Expansion (0-300° C.) | $9.0 \times 10^{-7}$/° C. | $9.7 \times 10^{-7}$/° C. |
| Density | 2.53 g/cc | 2.54 g/cc |
| Young's Modulus | 86.8 GPa | 86.8 GPa |
| Shear Modulus | 35 GPa | 35 GPa |
| Poisson Ratio | 0.25 | 0.25 |
| Vickers hardness (mean) | 748 kgf/mm$^2$ | 754 kgf/mm$^2$ |

TABLE 5-continued

|  | Comparative Example F | Example H |
|---|---|---|
| $K_{1C}$ Fracture Toughness (mean) | 0.93 MPa-m$^{1/2}$ | 0.89 MPa-m$^{1/2}$ |
| Vickers indentation crack initiation threshold | 7-10 kgf | 15-20 kgf |
| DOL after ion-exchange | 92.2 μm | 94.2 μm |

Examples F-H were also analyzed by X-Ray Rietveld analysis to evaluate crystallite size, phase percentage, residue glass and lattice constraints of each Example, as shown in Table 6. Crystallite size was determined using X-Ray Rietveld technique by assuming all crystals have a spherical shape without anisotropy. Accordingly, a scanning electron microscope (SEM) was also used to evaluate crystallite size.

TABLE 6

| | Crystallite Size (nm) | | | Residue Glass (wt %) | Crystalline Phase (wt %) | | | Lattice constraints (Å) | | | | |
|---|---|---|---|---|---|---|---|---|---|---|---|---|
| | | | | | | | | β-spodumene | | Rutile | | Gahnite |
| Ex. | β-spodumene | Rutile | Gahnite | | β-spodumene | Rutile | Gahnite | a | c | a | c | a |
| F | 168 ± 3 | 49 ± 1 | 34 ± 1 | 11 | 74.3 | 5.7 | 9.2 | 7.4911 | 9.0645 | 4.6022 | 2.9780 | 8.0926 |
| G | 164 ± 3 | 43 ± 1 | 29 ± 1 | 10 | 75.8 | 5.7 | 8.4 | 7.4930 | 9.0681 | 4.6027 | 2.9781 | 8.0924 |
| H | 176 ± 3 | 44 ± 1 | 41 ± 1 | 11 | 74.4 | 6 | 8.6 | 7.4917 | 9.0659 | 4.6027 | 2.9797 | 8.0930 |

Table 6 shows no difference in terms of measured crystalline size, residue glass, crystalline phase or lattice constraints. This is confirmed by the SEM evaluation. FIGS. 3A-3C are SEM backscattered electron image (BEI) micrographs of Comparative Example F taken at a magnification of 5,000× (FIG. 3A), 10,000× (FIG. 3B) and 20,000× (FIG. 3C), which illustrate the crystal phase assemblage of Comparative Example F. FIGS. 4A-4C are SEM BEI micrographs of Comparative Example G taken at a magnification of 5,000× (FIG. 4A), 10,000× (FIG. 4B) and 20,000× (FIG. 4C), which illustrate the crystal phase assemblage of Comparative Example G. FIGS. 5A-5C are SEM BEI micrographs of Example taken at a magnification of 5,000× (FIG. 5A), 10,000× (FIG. 5B) and 20,000× (FIG. 5C), which illustrate the crystal phase assemblage of Example H. A comparison of FIGS. 3A, 4A and 5A, a comparison of FIGS. 3B, 4B and 5B and a comparison of FIGS. 3C, 4C and 5C show no difference in microstructure between Examples F, G and H, in terms of structure, grain size or crystalline phase.

Figure 7:
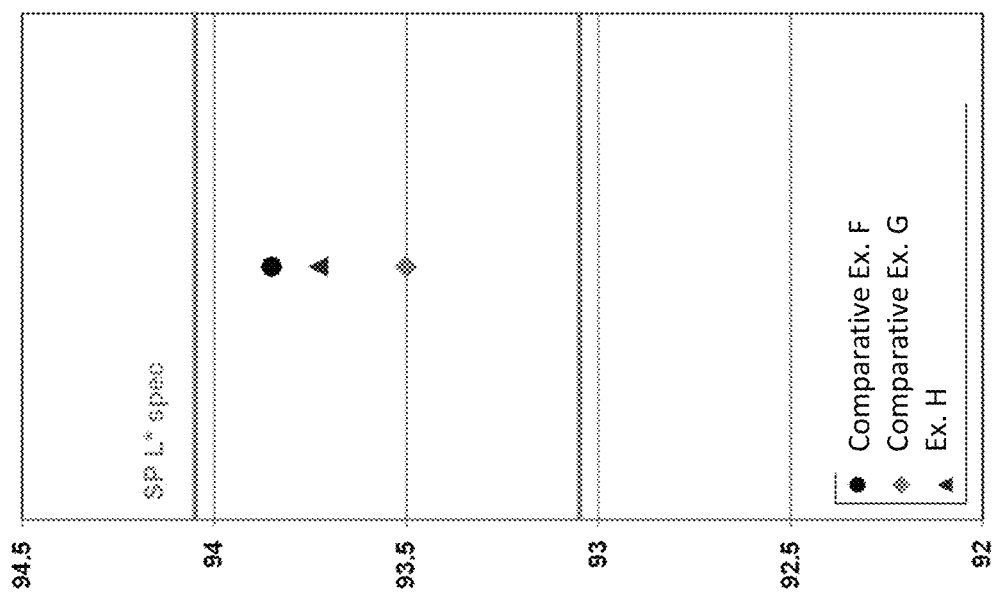
FIG. 7 illustrates the CIELAB L* color coordinates, measured using F02 illuminant, with specular reflectance included, of Comparative Examples F and G and Example H.

CIELAB color space coordinates (e.g., CIE L*; CIE a*; and CIE b*; or CIE L*, a*, and b*; or L*, a*, and b*) were also measured to characterize the color of Examples F-H. As shown in FIGS. 6 and 7, Examples F-H have similar or, in some cases, identical CIELAB color space coordinates. Comparative Example F has a CIE a* coordinate of about −0.25. Comparative Example G and Comparative 3 each have a CIE a* coordinate of about −0.3. Comparative Example F has a CIE b* coordinate of about −0.2, Comparative Example G has a CIE b* coordinate of about −0.1 and Example H has a CIE b* coordinate of about −0.05.

Examples I-L

The glass-ceramics samples of Examples I-L were prepared by forming molten precursor glass in the same manner as Examples F-H, using one of the compositions provided in Table 1. The molten precursor glasses were then formed into glass precursors, which were then subjected to one of the Ceramming Cycles provided in Table 4. Table 7 summarizes each of Examples I-L.

TABLE 7

| | Composition (provided in Table 1) | Precursor Glass thickness (mm) | Ceramming cycle (provided in Table 4) |
|---|---|---|---|
| Comparative Example I | Composition 1 | 15 mm (glass bar) | 1 |
| Comparative Example J | Composition 2 | 13 mm (thick glass sheet) | 1 |
| Comparative Example K | Composition 2 | 15 mm | 2 |
| Example L | Composition 1 | 1.24 mm | 3 |

Figure 8:
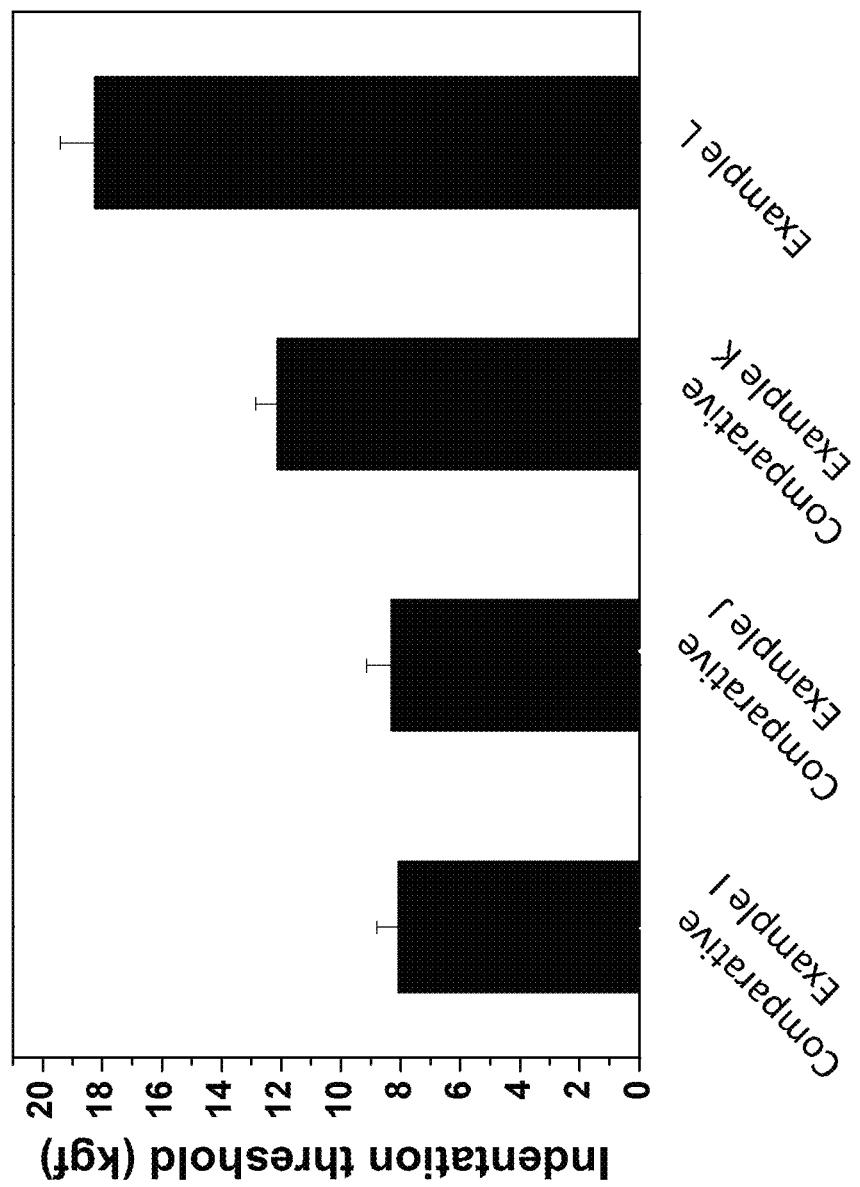
FIG. 8 graphically shows the Vickers indentation crack initiation threshold of Comparative Examples I-K and Example L.

Five samples of each of the glass-ceramics of Examples I-L were chemically strengthened in an ion exchange process by immersing each glass-ceramic into a NaNO$_3$ bath having a temperature of about 390° C. for 3.5 hours. Each sample was then subjected to an indentation fracture threshold test using a digital controller supplied by Instron Corp. of model 5500R to determine the average Vickers indentation crack initiation threshold for each of Examples I-L, as described herein. FIG. 8 illustrates the Vickers indentation crack initiation threshold results for each of Examples I-L. As shown in FIG. 8, Example L, which was formed by subjecting a thin rolled glass sheet having a thickness of 1 mm to a ceramming cycle comprising a rapid cooling rate (17° C./minute) exhibited a Vickers indentation crack initiation threshold that is more than two times greater than the Vickers indentation crack initiation threshold exhibited by Comparative Examples I and J. Comparative Example K, which was formed by subjecting a 15 mm thick glass sheet to a ceramming cycle comprising a cooling rate of 13° C./minute, exhibited a Vickers indentation crack initiation threshold greater than exhibited by Comparative Examples I and J; however, the Vickers indentation crack initiation threshold exhibited by Comparative Example K was still significantly less than exhibited by Example L. These results indicate that a ceramming cycle comprising a higher cooling rate provided improved crack resistance (e.g., Comparative Examples J and K used glass sheets with identical compositions and thicknesses but exhibited different Vickers indentation crack initiation threshold values).

Examples M-O

The glass-ceramics samples of Examples M-O were prepared by forming molten precursor glass in the same manner as Examples F-H, using one of the compositions provided in Table 1. In Comparative Example M, the molten precursor glass was formed into a bar in the same manner as Example F. For Example N, a bar was formed in a similar manner as those formed for Example M (and Example F) but was machined before ceramming to provide a thickness of 1 mm. In Example 0, the molten precursor glass was thin rolled into a 1 mm glass sheet in the same manner as Example H. The glass precursors of Comparative Example M and Examples N-O were then subjected to Ceramming Cycle 3, as provided in Table 4. Table 8 summarizes each of Examples M-O.

TABLE 8

| | Composition (referring to Table 1) | Precursor Glass thickness (mm) | Ceramming cycle (referring to Table 4) |
|---|---|---|---|
| Comparative Example M | Composition 1 | 15 mm (glass bar) | 3 |
| Example N | Composition 1 | 1 mm (glass sheet formed by machining of bars 1 cm thick) | 3 |
| Example O | Composition 1 | 1.24 mm (thin rolled glass sheet) | 3 |

Figure 9:
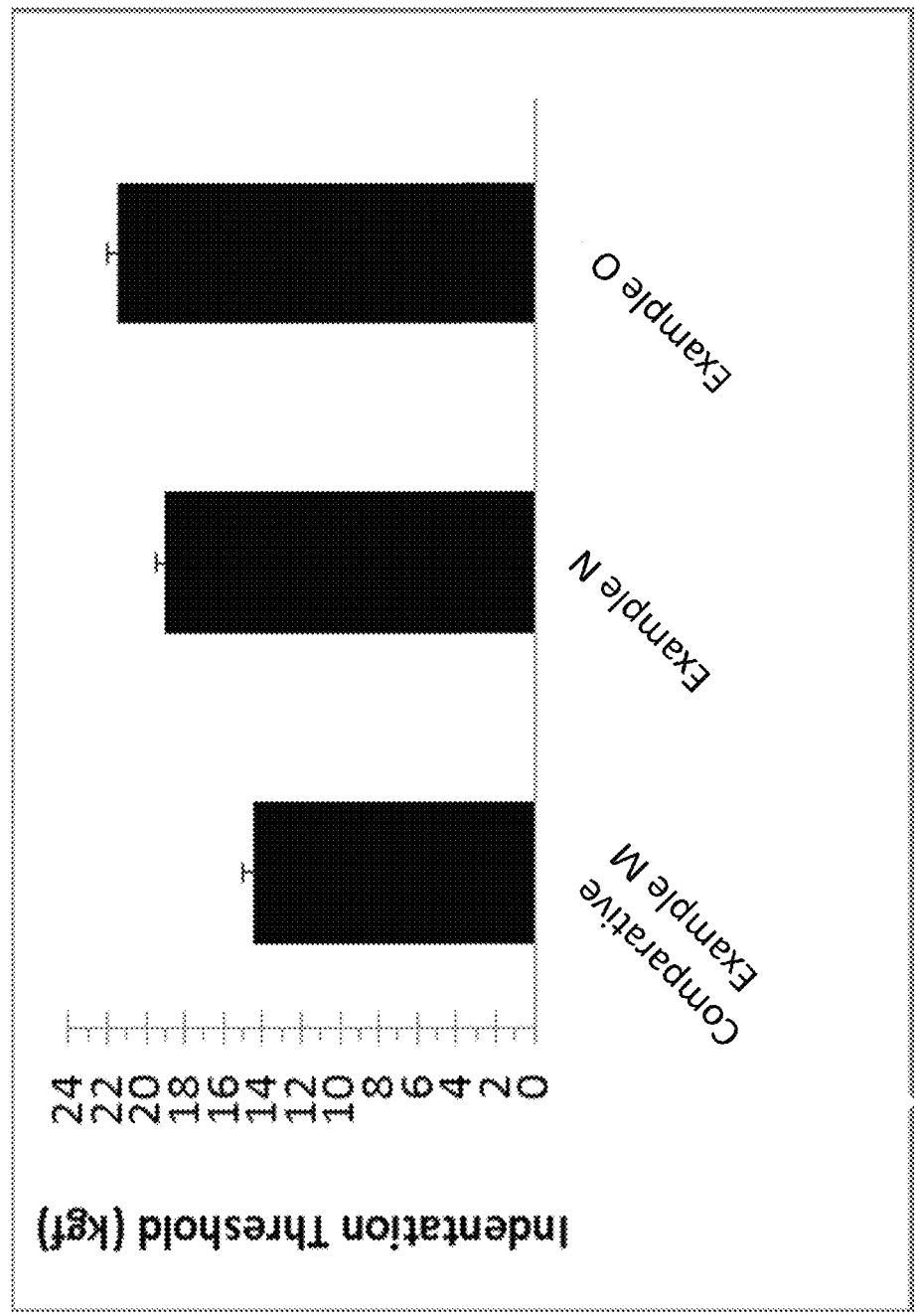
FIG. 9 graphically shows the Vickers indentation crack initiation threshold of known glass-ceramics and glass-ceramics according to one or more embodiments.

Accordingly, between Comparative Example M and Examples N and O, the only difference was the geometry of the glass precursor and how the glass precursor was formed. Each of the glass-ceramics of Examples M-O were polished to 0.8 mm and then chemically strengthened in an ion exchange process by immersing each glass-ceramic into a $NaNO_3$ bath having a temperature of about 390° C. for 3.5 hours. Each glass-ceramic was then subjected to an indentation fracture threshold test using a digital controller supplied by Instron Corp. of model Tukon 2500 to determine the Vickers indentation crack initiation threshold, as described herein. FIG. 9 illustrates the Vickers indentation crack initiation threshold results for each of Examples M-O. As shown in FIG. 9, both Examples N and O, which were formed from thin glass sheets, exhibited significantly higher Vickers indentation crack initiation threshold values over Comparative Example M. Example N, which was formed by subjecting a 1 mm thick glass sheet (formed by a process other than rolling) to the same shortened ceramming cycle, exhibited an improved Vickers indentation crack initiation threshold value.

As shown in Examples F-N, glass-ceramics exhibiting improved crack resistance can be provided by controlling at least the geometry of the glass precursor and the ceramming cycles (especially the cooling rate at the end of the ceramming cycle) by which the glass precursors are treated. Specifically, the use of thin or thin rolled precursor glass sheets instead of thick sheets or bars exhibited improved crack resistance (see, e.g., Examples M-O). Moreover, using a using a faster cooling cycle and in some embodiments a shorter ceramming cycle, and, in some embodiments, a shorter cooling cycle and/or faster cooling rate, also significantly increased the crack resistance of the glass-ceramics (see, e.g., Examples I-L). The shorter ceramming cycle (including the shorter cooling cycle and/or faster cooling rate) does not alter the crystalline phase assemblage of the glass-ceramics and the color attributes of the glass-ceramic are not affected (see, e.g., Examples F-H).

Examples P-R

Examples P-R were prepared from Composition 1 (referenced in Table 1), which was melted in an industrial furnace to form a molten glass. The molten glass was formed into a shape having the same dimensions. The samples were cerammed in a static furnace using the heating schedule of Ceramming Cycle 1, provided above in Table 4; however, the samples were cooled using different cooling rates. Example P was cooled to room temperature in the static furnace at a rate of about 5° C./minute. Examples Q-R were initially cooled in the furnace at the furnace rate (i.e., 5° C./minute) to 950° C. and then cooled by rapid electric fan quenching to room temperature. The estimated cooling rate of the rapid electric fan quenching is in the range from about 300° C. to about 500° C./min.

Without being bound by theory, it has been recognized that a fast cooling process leads to a higher fictive temperature in the glass or amorphous phase of the glass-ceramics, disclosed herein. This higher fictive temperature glass phase generally has a more open structure, which exhibits a densification mechanism under high load during indentation and results in a greater Vickers indentation crack initiation threshold value. Without being bound by theory, this densification mechanism seems to lead to a higher greater Vickers indentation crack initiation threshold value. The fictive temperature is used to characterize the structure of a glass-forming melt. The fictive temperature of a substance in a non-equilibrium state is defined as the actual temperature of the same substance in the equilibrium (liquid) state whose structure is similar to that of the non-equilibrium substance.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:

1. A method of making a glass-ceramic article comprising:
    a) heating a precursor glass article at a rate in the range from about 1° C./minute to 10° C./minute to a nucleating temperature (Tn) in the range from about 700° C. to 810° C., the precursor glass article having a thickness of about 2 mm or less and a composition comprising $B_2O_3$,
    b) maintaining the precursor glass article at at least the Tn within the range of from about 700° C. to 810° C. to produce a nucleated glass article,
    c) heating the nucleated glass article at a rate in the range from about 1° C./minute to about 10° C./minute to a crystallization temperature (Tc) in the range from about 850° to about 1250° C.,
    d) maintaining the nucleated glass article at at least the Tc to produce a glass-ceramic article having a crystalline phase, and
    e) cooling the glass-ceramic article from (i) a temperature of within a range from 800° C. to about 1250° C. to (ii) about room temperature at an average rate of 10° C./minute or greater, and less than 6 hours elapsing from beginning step a) through step e);
    wherein, the glass-ceramic article exhibits a color presented in CIELAB color space coordinates for an observer angle of 10° and a CIE illuminant F02 determined from reflectance spectra measurements using a spectrophotometer with specular reflectance included, the color space coordinates comprising:
    CIE a* between −3 and +3,
    CIE b* between −6 and +6, and
    CIE L* between 88 and 97.

2. The method of claim 1, further comprising ion exchanging the glass-ceramic article to generate a compressive stress layer comprising a compressive stress of at least 300 MPa and a depth of compressive stress layer of at least about 1% of the overall thickness of the glass-ceramic article.

3. The method of claim 2, wherein the glass-ceramic article exhibits a Vickers crack initiation threshold of at least 15 kgf.

4. The method of claim 1, wherein less than about 4 hours elapses from beginning step a) through step e).

5. The method of claim 1, wherein the cooling extends for less than 1.5 hours.

6. The method of claim 1, wherein the glass-ceramic article comprises, in mole %:
$SiO_2$ in the range from about 62 to about 75;
$Al_2O_3$ in the range from about 10.5 to about 17;
$Li_2O$ in the range from about 5 to about 13;
ZnO in the range from about 0 to about 4;
MgO in the range from about 0 to about 8;
$TiO_2$ in the range from about 2 to about 5;
$B_2O_3$ to about 4;
$Na_2O$ in the range from about 0 to about 5;
$K_2O$ in the range from about 0 to about 4;
$ZrO_2$ in the range from about 0 to about 2;
$P_2O_5$ in the range from about 0 to about 7;
$Fe_2O_3$ in the range from about 0 to about 0.3;
MnOx in the range from about 0 to about 2;
$SnO_2$ in the range from about 0.05 to about 0.2;
a ratio $$\frac{[Li_2O + Na_2O + K_2O + MgO + ZnO]}{[Al_2O_3 + B_2O_3]}$$

in the range from about 0.7 to about 1.5; and
a ratio:

$$\frac{[TiO_2 + SnO_2]}{[SiO_2 + B_2O_3]}$$

greater than about 0.04.

7. The method of claim 6, wherein the glass-ceramic article exhibits a Vickers crack initiation threshold of at least about 15 kgf.

8. The method of claim 7, wherein the glass-ceramic article exhibits a Vickers crack initiation threshold of at least about 20 kgf.

9. The method of claim 1, wherein the crystalline phase comprises at least one of a β-spodumene solid solution, a Ti-containing crystalline phase, a spinel structure and cordierite.

10. The method of claim 9, wherein the Ti-containing crystalline phase comprises at least one of rutile, anatase, magnesium titanate and aluminum titanate.

11. The method of claim 9, wherein the crystalline phase comprises β-spodumene.

12. The method of claim 11, wherein the β-spodumene crystalline phase comprises a predominant crystalline phase.

13. The method of claim 1, wherein the crystalline phase comprises at least 20 wt % of the glass-ceramic article.

14. The method of claim 13, wherein the crystalline phase comprises at least 70 wt % of the glass-ceramic article.

15. The method of claim 1, wherein the glass-ceramic article exhibits an average opacity of at least 85% over a wavelength in the range from about 400 nm to about 700 nm for a thickness of about 0.8 mm.

16. The method of claim 1, wherein the glass-ceramic article exhibits a color presented in CIELAB color space coordinates for an observer angle of 10° and a CIE illuminant F02 determined from reflectance spectra measurements using a spectrophotometer with specular reflectance included, the color space coordinates comprising:
CIE a* between −1 and +1,
CIE b* between −0.5 and +0.5, and
CIE L* between 93 and 96.5.

17. A method of making a glass-ceramic article comprising:
  a) subjecting a glass substrate having a thickness of about 2 mm or less to a temperature of 700° C. to 810° C. for a period of time sufficient to form a nucleated glass substrate;
  b) subjecting the nucleated glass substrate to a temperature of 850° C. to 1250° C. for a period of time sufficient to form a glass-ceramic article having a crystalline phase; and
  c) cooling the glass-ceramic article from (i) a temperature of within a range of 800° C. to about 1250° C. to (ii) room temperature at a rate of 300° C./minute to 500° C./minute.

18. The method of claim 17, wherein the temperature of step b) is 950° C. to 1250° C., the method further comprising:
  after b) but before c), cooling the glass-ceramic article from the temperature of the range of b) to the temperature of c) during a time period of 5 minutes to 35 minutes; and
  after c), ion-exchanging the glass-ceramic article to form a compressive layer of compressive stress;
  wherein, the glass-ceramic article has a Vickers indentation crack initiation threshold of greater than 20 kgf; and
  wherein, the glass substrate has a composition comprising, in mole %: 62 to 75 $SiO_2$; 10.5 to 17 $Al_2O_3$; 5 to 13 $Li_2O$; 0 to 4 ZnO; 0 to 8 MgO; 2 to 5 $TiO_2$; $B_2O_3$; 0 to 5 $Na_2O$; 0 to 4 $K_2O$; wherein the ratio of (i) the sum of $Li_2O$, $Na_2O$, $K_2O$, MgO, and ZnO, to (ii) the sum of $Al_2O_3$ and $B_2O_3$, is 0.7 to 1.

19. A method of making a glass-ceramic article comprising:
  a) reducing a thickness of a glass substrate from a first thickness of greater than 2 mm to a second thickness of about 2 mm or less using rolls, wherein the glass substrate has a composition comprising, in mole %: 62 to 75 $SiO_2$; 10.5 to 17 $Al_2O_3$; 5 to 13 $Li_2O$; 0 to 4 ZnO; 0 to 8 MgO; 2 to 5 $TiO_2$; $B_2O_3$; 0 to 5 $Na_2O$; 0 to 4 $K_2O$; wherein the ratio of (i) the sum of $Li_2O$, $Na_2O$, $K_2O$, MgO, and ZnO, to (ii) the sum of $Al_2O_3$ and $B_2O_3$, is 0.7 to 1;
  b) subjecting the glass substrate to a temperature of 700° C. to 810° C. for a period of time sufficient to form a nucleated glass substrate;
  c) subjecting the nucleated glass substrate to a temperature of 850° C. to 1250° C. for a period of time sufficient to form a glass-ceramic article having a crystalline phase; and
  d) cooling the glass-ceramic article to room temperature at a rate of 10° C./minute or greater.

20. The method of claim 19 further comprising e) ion-exchanging the glass-ceramic article to form a compressive layer of compressive stress;
  wherein, the glass-ceramic article has a Vickers indentation crack initiation threshold of greater than 15 kgf.

21. The method of claim 19,
wherein the crystalline phase comprises at least 70 wt % of the glass-ceramic article;
wherein the crystalline phase is predominately β-spodumene crystalline phase; and
wherein the glass-ceramic article exhibits a color presented in CIELAB color space coordinates for an observer angle of 10° and a CIE illuminant F02 determined from reflectance spectra measurements using a spectrophotometer with specular reflectance included, the color space coordinates comprising:
CIE a* between −1 and +1,
CIE b* between −0.5 and +0.5, and
CIE L* between 93 and 96.5.

* * * * *